(12) United States Patent
Ichikawa et al.

(10) Patent No.: US 11,138,876 B2
(45) Date of Patent: Oct. 5, 2021

(54) INFORMATION SYSTEM, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Shinji Ichikawa, Nagoya (JP); Harunobu Saito, Nagoya (JP); Daiki Kaneichi, Nisshin (JP); Ryotaro Fujiwara, Tokyo-to (JP); Megumi Amano, Toyota (JP); Masato Endo, Nagakute (JP); Tae Sugimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/549,044

(22) Filed: Aug. 23, 2019

(65) Prior Publication Data
US 2020/0066146 A1    Feb. 27, 2020

(30) Foreign Application Priority Data

Aug. 23, 2018    (JP) .............................. JP2018-156594

(51) Int. Cl.
| G08G 1/09 | (2006.01) |
| G06K 9/00 | (2006.01) |
| G06T 7/20 | (2017.01) |
| G06T 7/70 | (2017.01) |
| G06F 3/14 | (2006.01) |

(Continued)

(52) U.S. Cl.
CPC .............. *G08G 1/091* (2013.01); *G06F 3/14* (2013.01); *G06K 9/00785* (2013.01); *G06K 9/00798* (2013.01); *G06T 7/20* (2013.01); *G06T 7/70* (2017.01); *G08G 1/0133* (2013.01); *G06T 2207/30236* (2013.01); *G06T 2207/30252* (2013.01); *H04L 67/12* (2013.01)

(58) Field of Classification Search
CPC .. G06F 3/14; G06K 9/00785; G06K 9/00798; G06T 2207/30236; G06T 2207/30252; G06T 7/20; G06T 7/70; G08G 1/0133; G08G 1/091; H04L 67/12; H04L 67/18
See application file for complete search history.

(56) References Cited

U.S. PATENT DOCUMENTS

| 2010/0020169 A1* | 1/2010 | Jang ................... G08G 1/0962 |
| | | 348/115 |
| 2014/0078282 A1* | 3/2014 | Aoki .................. G06K 9/00221 |
| | | 348/78 |

(Continued)

FOREIGN PATENT DOCUMENTS

| CN | 108288312 A | 7/2018 |
| JP | 2012-226017 A | 11/2012 |

*Primary Examiner* — Farzana Hossain
(74) *Attorney, Agent, or Firm* — Oliff PLC

(57) ABSTRACT

An information system comprises a controller which is configured to execute: acquiring a screen image of a vehicle which is traveling on a roadway, the screen image being photographed by the aid of an image pickup unit; detecting a dangerous driving state of the vehicle which is traveling, in accordance with a time course of the screen image; and displaying information in relation to the vehicle having been detected to be in the dangerous driving state on a signage apparatus.

4 Claims, 16 Drawing Sheets

(51) Int. Cl.
*G08G 1/01* (2006.01)
*H04L 29/08* (2006.01)

(56) References Cited

U.S. PATENT DOCUMENTS

| | | | |
|---|---|---|---|
| 2015/0227965 A1* | 8/2015 | Drysch | G06K 9/00791 |
| | | | 705/14.45 |
| 2017/0371608 A1* | 12/2017 | Wasserman | G06F 3/14 |
| 2018/0144636 A1* | 5/2018 | Becker | B60W 30/00 |
| 2019/0001993 A1* | 1/2019 | Visintainer | B60W 30/0953 |
| 2019/0283763 A1 | 9/2019 | Wang | |
| 2020/0011689 A1* | 1/2020 | Tatsumi | G01C 21/3484 |

* cited by examiner

[Fig. 1]
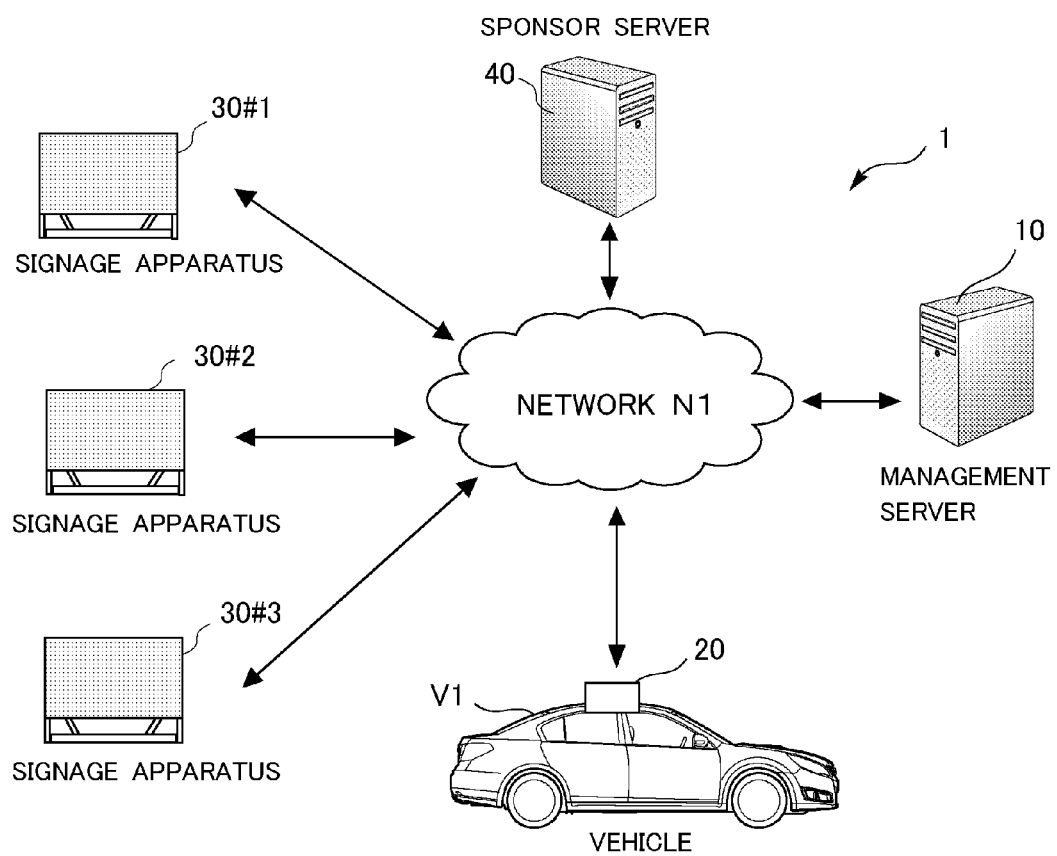

[Fig. 2A]
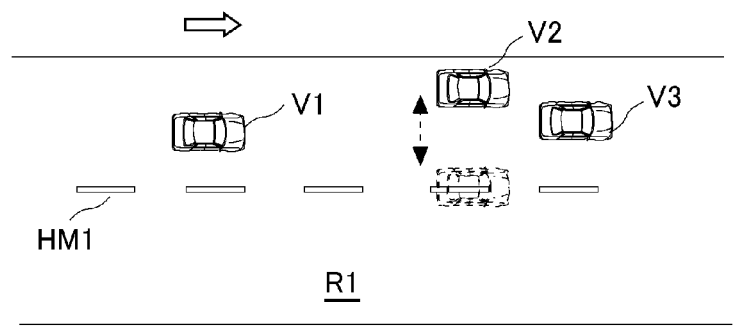
[Fig. 2B]
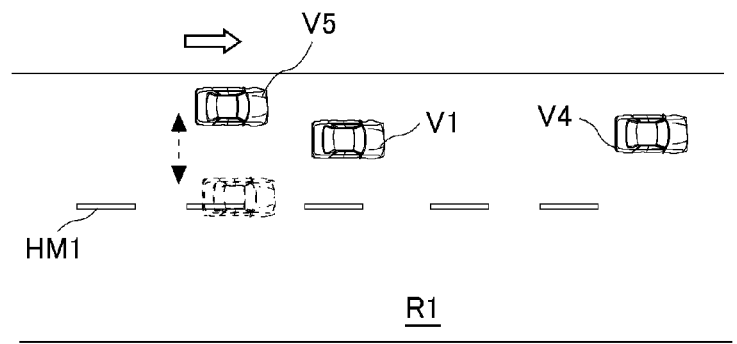

[Fig. 3A]
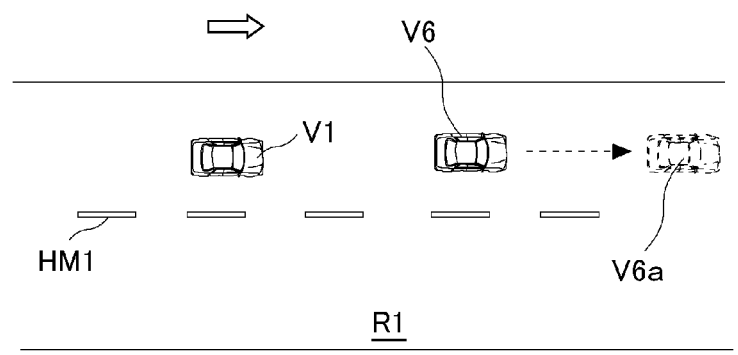
[Fig. 3B]
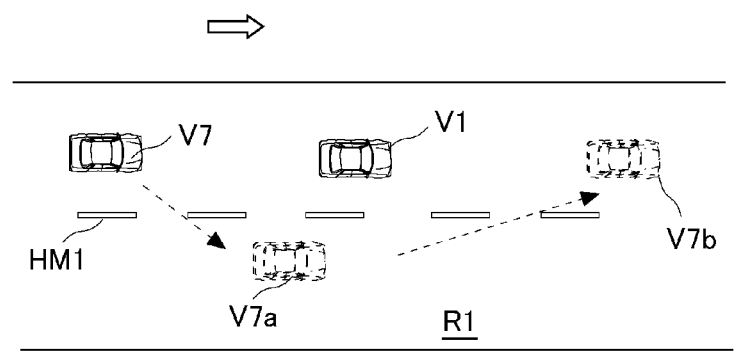

[Fig. 4]
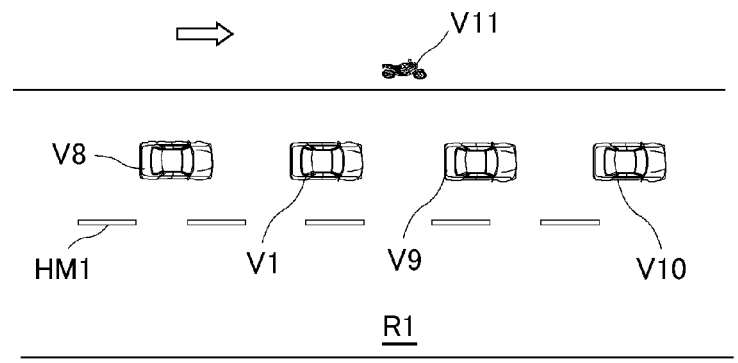
[Fig. 5]
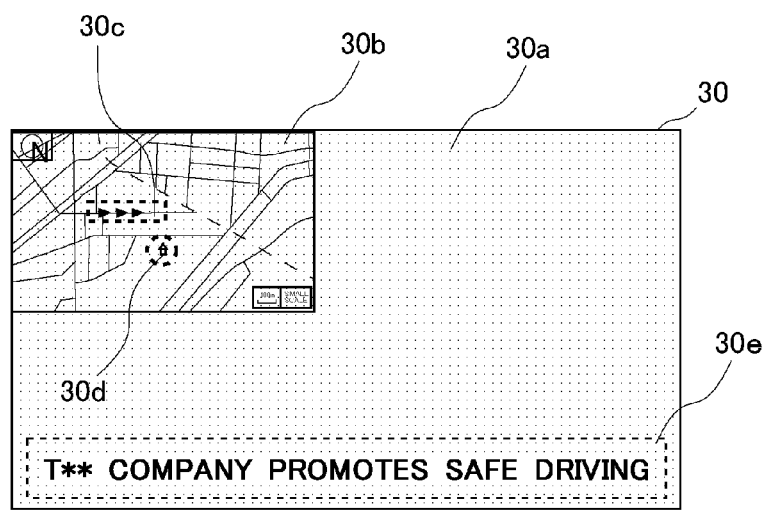

[Fig. 6]
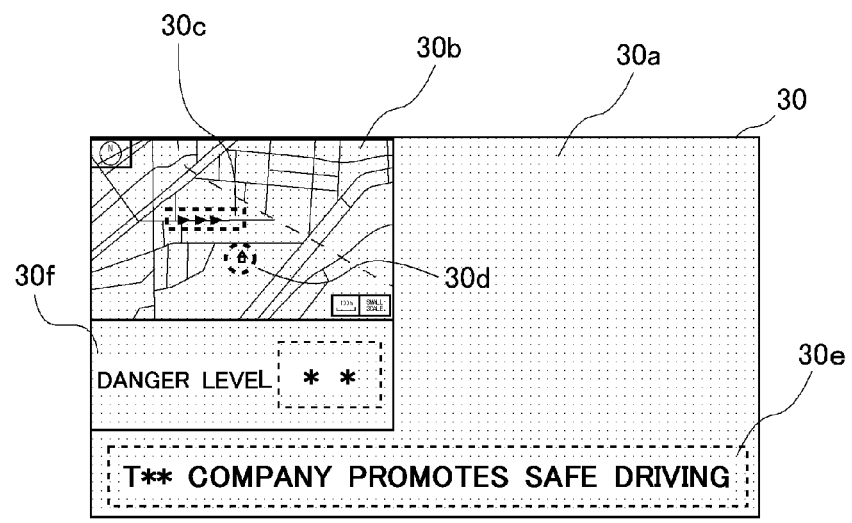

[Fig. 7]
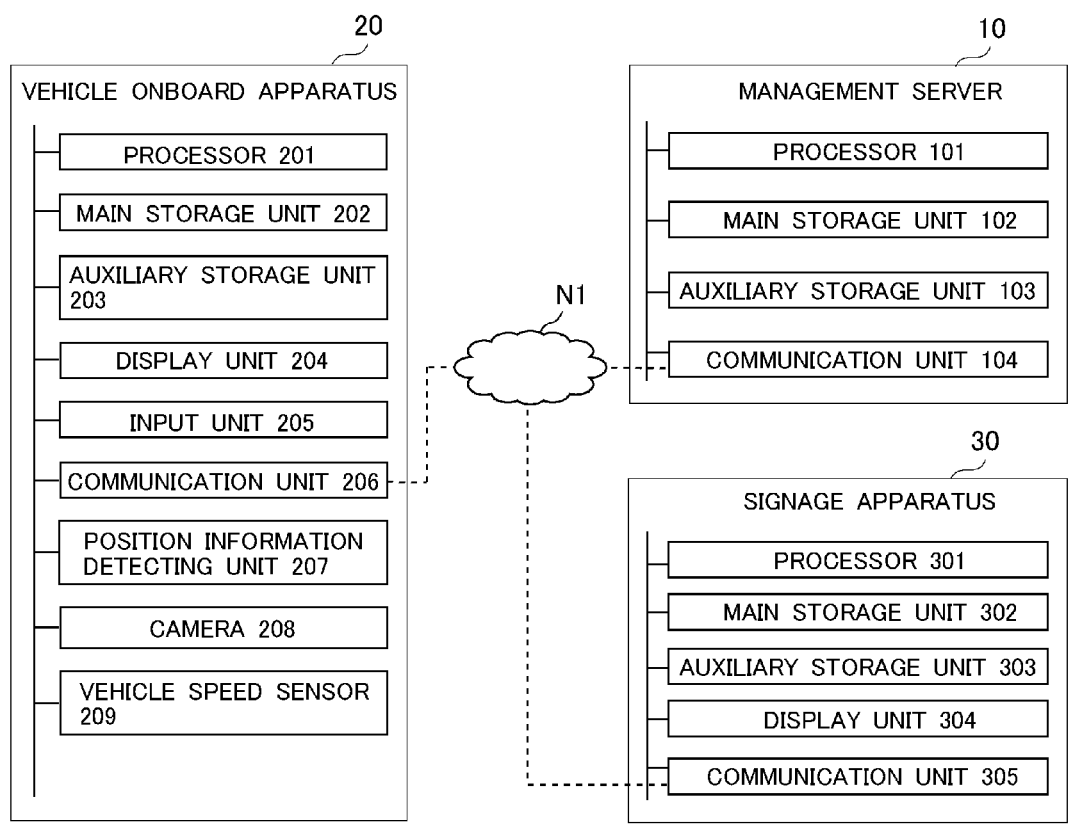

[Fig. 8]
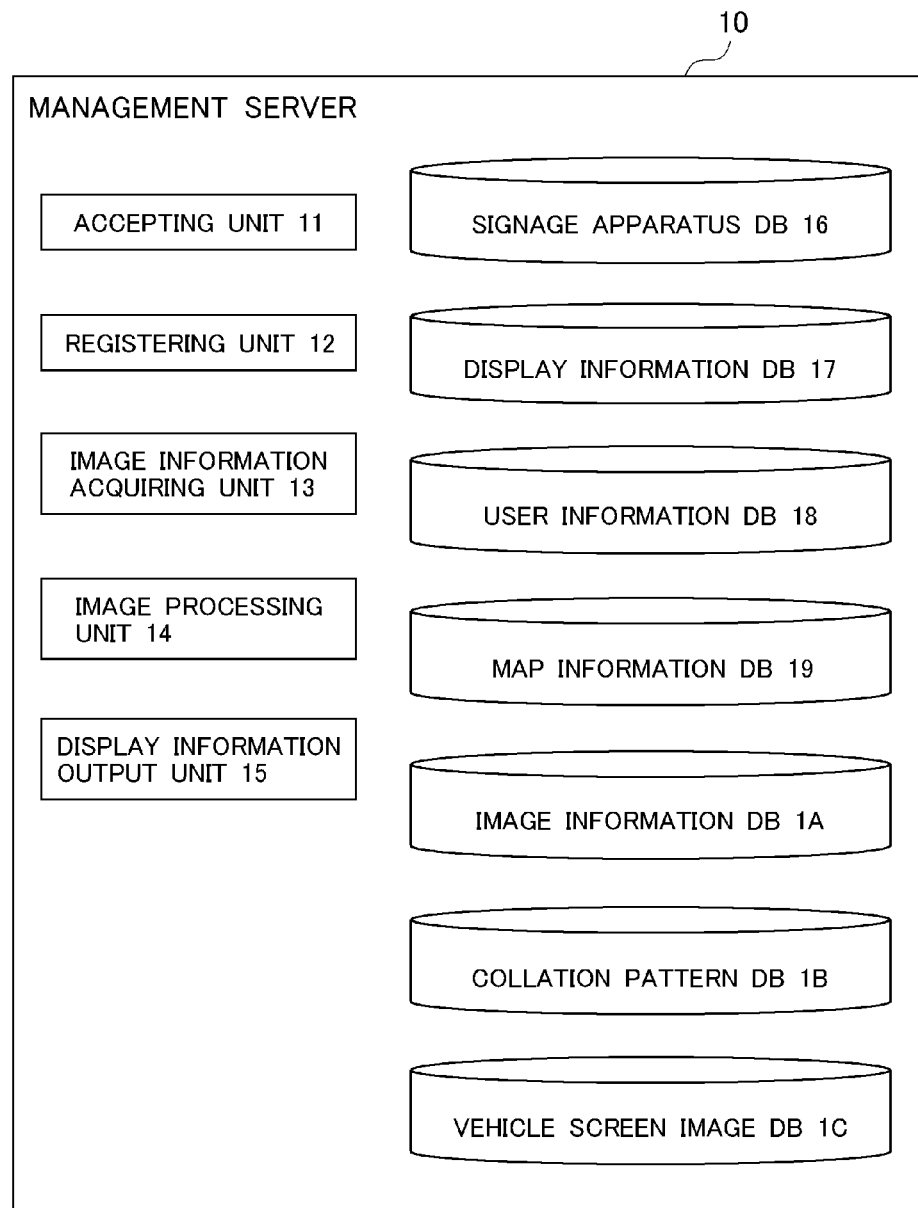

[FIG. 9]

| ADVERTISER ID | AREA ID | APPARATUS ID | INSTALLATION POSITION | DISPLAY INFORMATION NUMBER | DISPLAY DATA | MESSAGE INFORMATION | DISPLAY TERM | TIME ZONE | CLASSIFICATION |
|---|---|---|---|---|---|---|---|---|---|
| ... | ... | ... | ... | ... | ... | ... | ... | ... | ... |
| T001 | D00 | D00A |  | P000A1 | ... | — |  | 11:00-14:00 | STILL IMAGE |
|  |  |  |  | P000A2 | ... | — | 2018/04/01 - 2018/04/28 | 15:00-17:00 | SLIDE SHOW |
|  |  |  |  | P000A3 | ... | — |  | 18:00-20:00 | MOVING IMAGE |
|  |  |  | ... | ... | ... | — |  | ... | ... |
| S001 |  |  |  | PPPPPP | — | T** COMPANY PROMOTES SAFE DRIVING |  | — | — |
| ... | ... | ... |  | ... | ... | ... |  | ... | ... |

[Fig. 10]

| ACQUISITION No. | DATE AND TIME OF ACQUISITION | IMAGE INFORMATION | | | PROCESSING STATUS |
|---|---|---|---|---|---|
| | | SCREEN IMAGE | POSITION | SPEED | |
| ... | YYYYMMDDHHm1 | VD****1 | ... | ... | |
| ... | YYYYMMDDHHm2 | VD****2 | ... | ... | |
| ... | YYYYMMDDHHm3 | VD****3 | ... | ... | |
| ⋮ | ⋮ | ⋮ | ⋮ | ⋮ | ⋮ |

[Fig. 11]

| DISPLAY MANAGEMENT No. | DATE AND TIME OF ACQUISITION | SCREEN IMAGE | VEHICLE INFORMATION | | | | | DANGER LEVEL |
|---|---|---|---|---|---|---|---|---|
| | | | TERM | DATA | VEHICLE NUMBER | FACE INFORMATION | CLASSIFICATION OF ACTION | |
| PD00A | YYYYMMDDHHm2 | VD****2 | H1m21-H1m25 | ... | ... | PRESENT | TAILGATING | A |
| ... | ... | ... | ... | ... | ... | ... | ... | ... |
| ⋮ | ⋮ | ⋮ | ⋮ | ⋮ | ⋮ | ⋮ | ⋮ | ⋮ |

[Fig. 12]
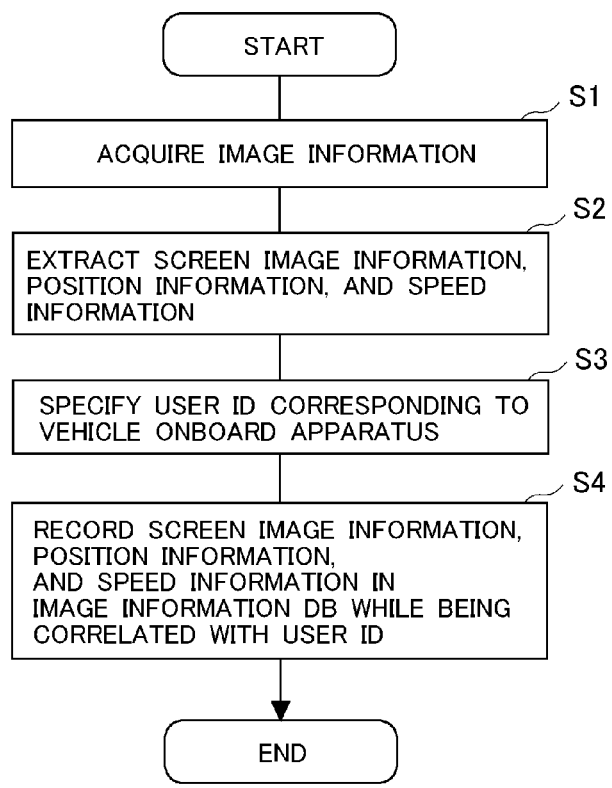

[Fig. 13]
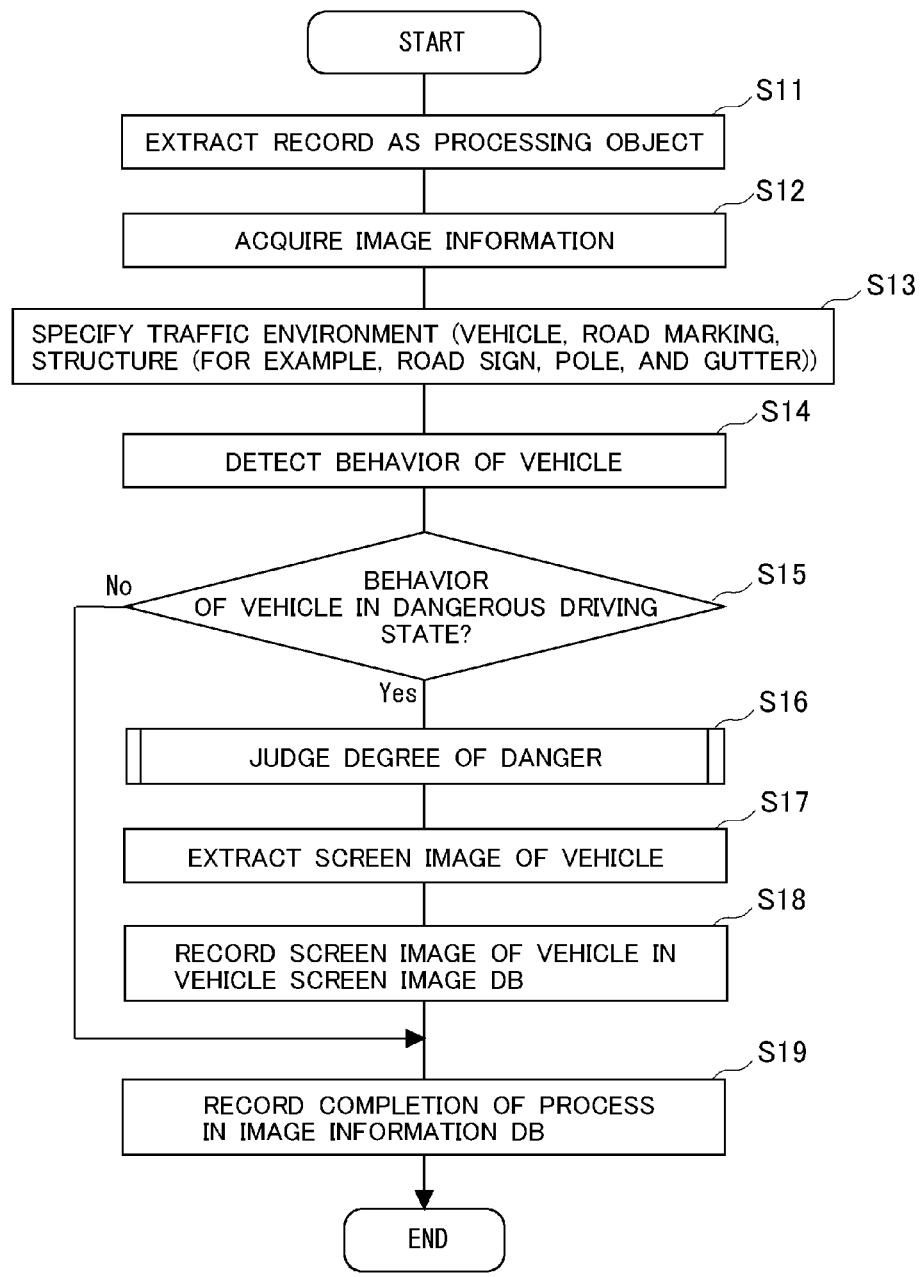

[Fig. 14]
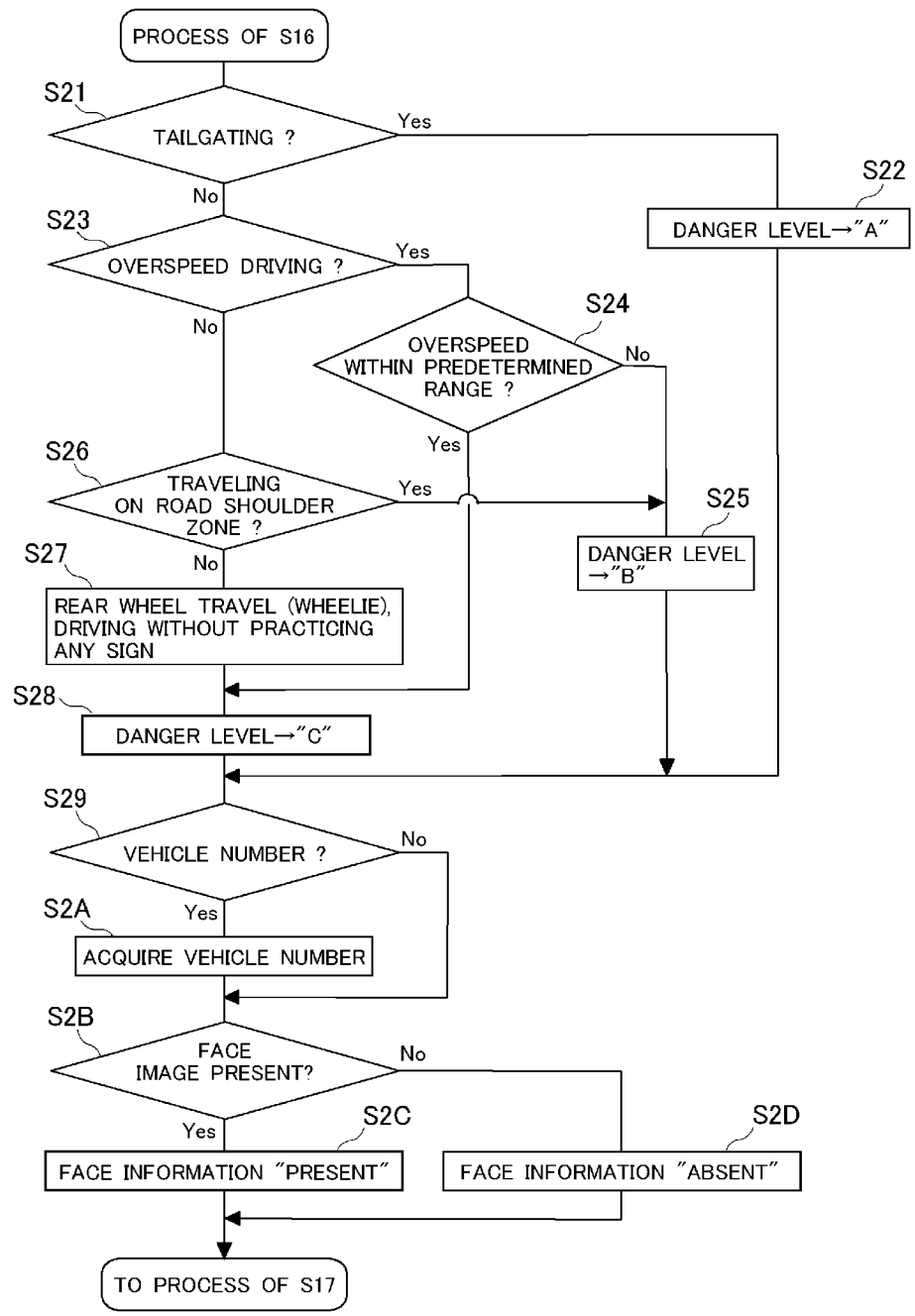

[Fig. 15]
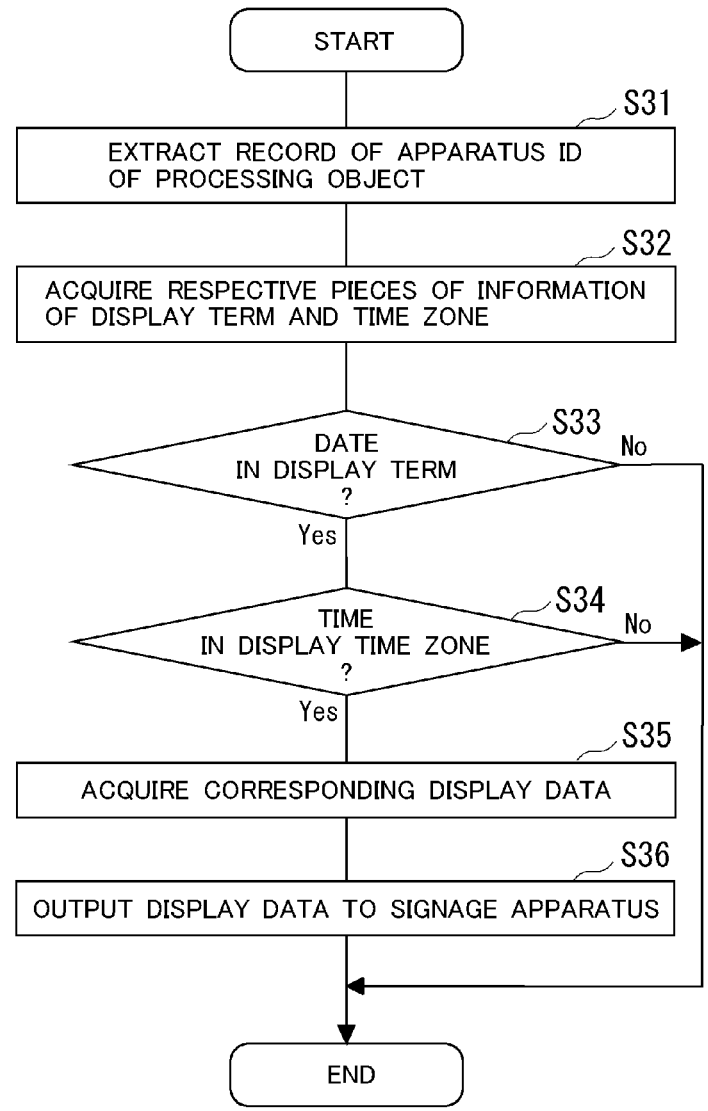

[Fig. 16]
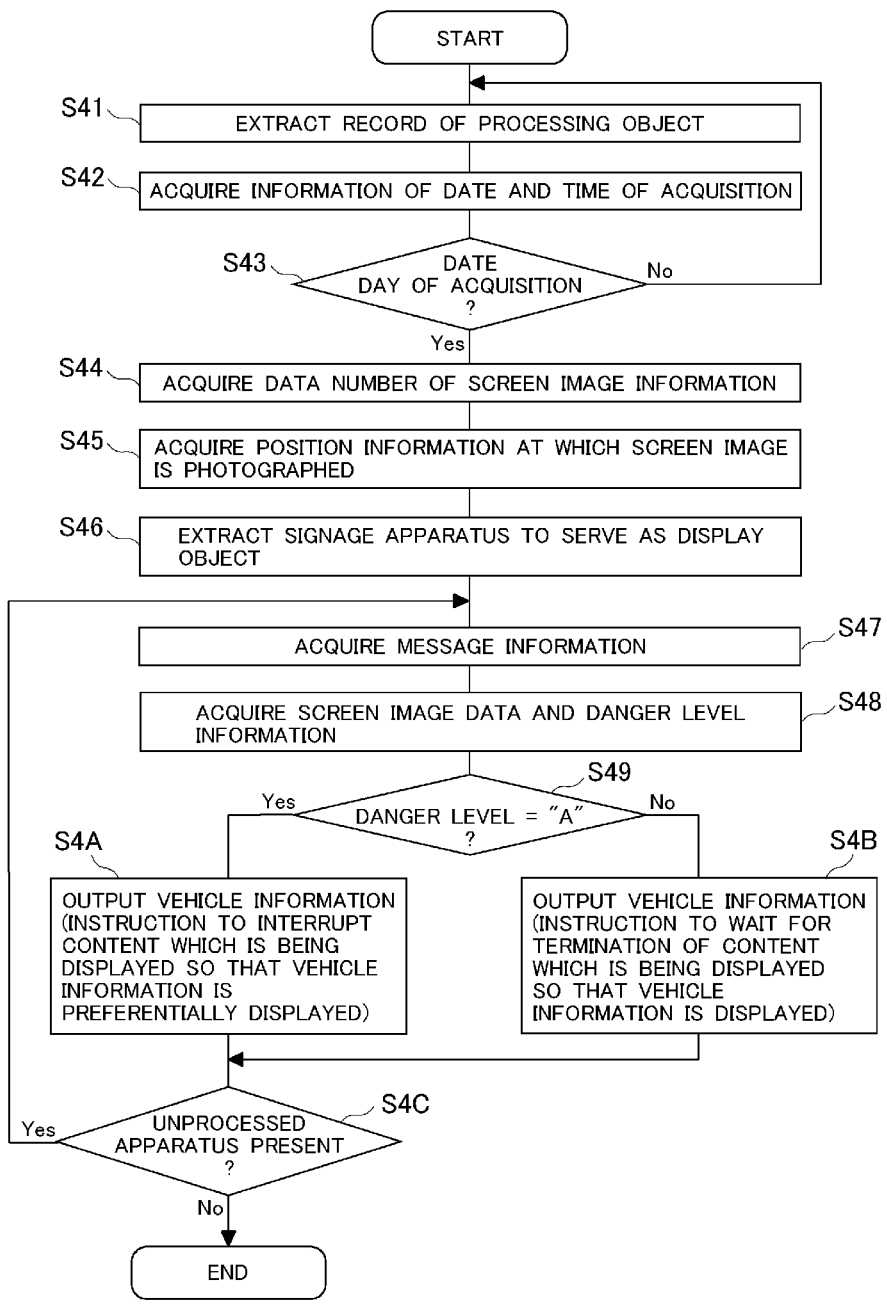

[Fig. 17]
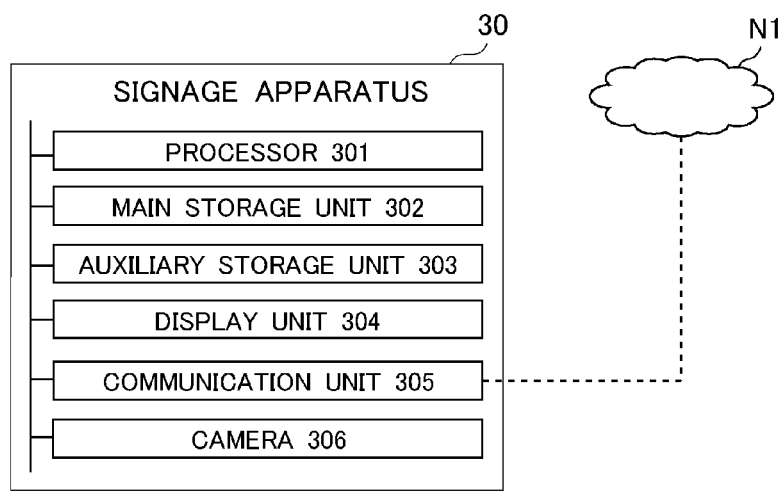

INFORMATION SYSTEM, INFORMATION PROCESSING METHOD, AND NON-TRANSITORY STORAGE MEDIUM

CROSS-REFERENCE TO RELATED APPLICATIONS

This application claims the benefit of Japanese Patent Application No. 2018-156594 filed on Aug. 23, 2018 which is hereby incorporated by reference herein in its entirety.

BACKGROUND

Technical Field

The present disclosure relates to an information system for displaying a digital signage, an information processing method, and a non-transitory storage medium.

Description of the Related Art

In recent years, an advertisement form such as the so-called digital signage (electronic signboard), in which an electronic advertisement is displayed on a display device at various places including, for example, an underground shopping area, a road neighborhood, and a commercial facility, becomes widespread. Patent Literature 1 discloses such a technique that a previously stored content is automatically generated and displayed on a digital signage. On the other hand, an effort to achieve safe driving is demanded in conformity with the development of the road traffic network.

CITATION LIST

Patent Literature

Patent Literature 1: Japanese Patent Application Laid-Open No. 2012-226017

SUMMARY

However, in the case of the background art described above, no consideration is made about the contribution to the safe driving by sensing a phenomenon which occurs in real time. An object of the present disclosure is to provide such a technique that a phenomenon, which occurs in real time, is sensed to generate a content which is displayed on a signage apparatus in order to advance the safe driving thereby.

One aspect of the present disclosure is exemplified as an information system. This information system comprises a controller which includes at least one processor. The controller may be configured to execute:

acquiring a screen image of a vehicle which is traveling on a roadway, the screen image being photographed by the aid of an image pickup unit;

detecting a dangerous driving state of the vehicle which is traveling, in accordance with a time course of the screen image; and displaying information in relation to the vehicle having been detected to be in the dangerous driving state on a signage apparatus.

Another aspect of the present disclosure is exemplified as an information processing method. In this aspect, the information processing method may be adapted to cause a computer to execute:

a step of acquiring a screen image of a vehicle which is traveling on a roadway, the screen image being photographed by the aid of an image pickup unit;

a step of detecting a dangerous driving state of the vehicle which is traveling, in accordance with a time course of the screen image; and a step of displaying information in relation to the vehicle having been detected to be in the dangerous driving state on a signage apparatus.

Still another aspect of the present disclosure is exemplified as an information processing program, or a non-transitory storage medium stored with the information processing program. In this aspect, the information processing program may be adapted to cause a computer to execute:

a step of acquiring a screen image of a vehicle which is traveling on a roadway, the screen image being photographed by the aid of an image pickup unit;

a step of detecting a dangerous driving state of the vehicle which is traveling, in accordance with a time course of the screen image; and a step of displaying information in relation to the vehicle having been detected to be in the dangerous driving state on a signage apparatus.

According to the present disclosure, it is possible to provide such a technique that a phenomenon, which occurs in real time, is sensed to generate a content which is displayed.

BRIEF DESCRIPTION OF THE DRAWINGS

FIG. 1 is a diagram illustrating exemplary system configuration of a safe driving promoting system according to a first embodiment.

FIG. 2A is a first diagram for explaining detection of a vehicle accompanied with dangerous driving.

FIG. 2B is a second diagram for explaining detection of a vehicle accompanied with dangerous driving.

FIG. 3A is a first diagram for explaining another form of detection of a vehicle accompanied with dangerous driving.

FIG. 3B is a second diagram for explaining another form of detection of a vehicle accompanied with dangerous driving.

FIG. 4 is a diagram for explaining still another form of detection of a vehicle accompanied with dangerous driving.

FIG. 5 is a diagram illustrating an exemplary display screen.

FIG. 6 is a diagram illustrating another exemplary display screen.

FIG. 7 is a diagram illustrating exemplary hardware configuration of each of a management server, a vehicle onboard apparatus (unit), and a signage apparatus.

FIG. 8 is a diagram illustrating exemplary functional configuration of the management server.

FIG. 9 is a diagram illustrating exemplary display information stored in a display information DB.

FIG. 10 is a diagram illustrating exemplary image information stored in an image information DB.

FIG. 11 is a diagram illustrating exemplary vehicle screen image information stored in a vehicle screen image DB.

FIG. 12 is a flow chart illustrating an exemplary process for acquiring image information.

FIG. 13 is a flow chart illustrating an exemplary image processing.

FIG. 14 is a flow chart illustrating the exemplary image processing.

FIG. 15 is a flow chart illustrating an exemplary process for outputting display information.

FIG. 16 is a flow chart illustrating an exemplary process for outputting a screen image of a vehicle accompanied with dangerous driving.

FIG. 17 is a diagram illustrating exemplary configuration of a signage apparatus according to a second embodiment.

DESCRIPTION OF THE EMBODIMENTS

A safe driving promoting system according to a first aspect of the present disclosure comprises a controller which executes acquisition of a screen image of a vehicle which is traveling on a roadway, the screen image being photographed by the aid of an image pickup unit; detection of a dangerous driving state of the vehicle which is traveling, in accordance with a time course of the screen image; and display on a signage apparatus of information in relation to the vehicle having been detected to be in the dangerous driving state.

According to the aspect as described above, the safe driving promoting system makes it possible to detect the vehicle which is in the dangerous state, from the screen image of the vehicle which is traveling on the roadway so that the content may be generated and displayed on the signage apparatus. The information, which is generated as the content, can include the information for specifying the vehicle including, for example, the screen image in which the behavior of the vehicle in the dangerous state is recorded, the traveling position and the traveling route of the vehicle, and the automobile registration number. In the aspect as described above, the phenomenon, which occurs in real time, can be sensed to generate the content which can be displayed.

In the first aspect, the controller may further execute detection of the dangerous driving state from at least one piece of information of a speed of the vehicle, an acceleration, a distance between the vehicle and another vehicle traveling ahead or behind the vehicle, an attitude of the vehicle, a frequency of lane change, and presence or absence of traveling in a traveling restricted area. According to the aspect as described above, the safe driving promoting system can detect the dangerous driving state such as the overspeed driving from the speed and/or the acceleration of the vehicle accompanied with the time course of the screen image. Similarly, it is possible to detect the dangerous driving state such as the tailgating from the distance between the vehicle and another vehicle traveling ahead or behind the vehicle. Further, for example, it is possible to detect, from the attitude of the vehicle, the dangerous driving state of any motorcycle which performs the rear wheel travel (wheelie) while allowing the front wheel to float over the ground. It is possible to detect, from the frequency of lane change, the dangerous driving state in which the vehicle travels while frequently repeating the lane change. It is possible to detect, from the presence or absence of the traveling in the traveling restricted area, the dangerous driving state such as the traveling on the road shoulder zone.

In the first aspect, the controller may further execute judgment of a degree of danger of the vehicle which is in the dangerous driving state on the basis of the information to display the judged degree of danger on the signage apparatus. According to the aspect as described above, it is possible to display the judged degree of danger together with the screen image of the vehicle which is in the dangerous state. Therefore, it is possible to expect such an effect that the mode of the dangerous driving action becomes well-known. In the first aspect, it is possible to improve the promotion of the safe driving.

An embodiment will be explained below with reference to the drawings. The configuration of the following embodiment is shown by way of example. The mode for carrying out the disclosure is not limited to the configuration of the embodiment explained below.

First Embodiment (System Outline)

FIG. 1 is a diagram illustrating exemplary system configuration of a safe driving promoting system 1 according to a first embodiment. The safe driving promoting system 1 illustrated in FIG. 1 is such a system that the content, which is generated on the basis of a screen image of a vehicle which is traveling on a road and which is accompanied with any dangerous driving, is outputted to a signage apparatus. The "dangerous driving" herein refers to the driving action of the vehicle which causes any traffic danger on the road on which the vehicle is traveling. Typically, an action to perform the so-called tailgating or the like is exemplified, i.e., such a driving action is exemplified that a vehicle narrows the distance (following distance) between two cars and abnormally approaches another vehicle which is traveling and which exists therearound for any cause or any purpose, and/or the vehicle disturbs the advance or progress of the another vehicle. In the following description, the dangerous driving action is referred to as "dangerous driving" as well. The safe driving promoting system 1 (hereinafter simply referred to as "promoting system 1" as well) is an example of the "information system".

The promoting system 1 according to the first embodiment includes a management server 10, a vehicle onboard apparatus (unit) 20, a plurality of signage apparatuses (30 #1 to 30 #3), and a sponsor server 40 which are connected to one another by a network N1. The network N1 is, for example, a public network such as the internet or the like. The network N1 may include wireless communications such as WiFi and the like, wireless networks for mobile phone networks such as LTE, LTE-Advanced, 3G and the like, exclusively usable networks such as VPN (Virtual Private Network) and the like, and networks such as LAN (Local Area Network) and the like.

Note that in FIG. 1, one management server 10, one vehicle onboard apparatus 20, one sponsor server 40, and three signage apparatuses (30 #1 to 30 #3) are representatively illustrated by way of example. A plurality of management servers 10, a plurality of vehicle onboard apparatuses 20, and a plurality of sponsor servers 40 may be connected to the network N1. Further, the number of signage apparatuses to be connected to the network N1 is not limited to the number illustrated by way of example. Any number of signage apparatus or signage apparatuses may be available. In the following description, the plurality of signage apparatuses, which may be connected to the network N1, are generally referred to as "signage apparatus 30" as well.

The sponsor server 40 is a server apparatus which is managed by an enterprise as an advertiser, an advertising agency or the like. Note that the advertiser includes public organizations such as local governments and the like. The advertiser is, for example, a corporation which pays a charge for the operation of the signage apparatus 30. The display information of the advertiser who approves of the promotion of the safe driving, for example, the display data including the content configured by a still image, a moving image or the like is registered in the management server 10. The display information includes, for example, a slogan for the safe driving and/or a message of the approving advertiser.

The display information is registered in the management server 10, for example, together with the information which designates, for example, the area for installing the signage apparatus 30 and/or the term and the time zone for displaying the display information.

The signage apparatus 30 is an apparatus which receives the display information outputted from the management server 10 and which displays the display information on a display device. The display device may be configured or constructed integrally with the signage apparatus 30. Alternatively, the display device may be configured or constructed separately from the signage apparatus. The display device is configured or constructed, for example, by a liquid crystal display, an organic EL display, an LED matrix, or a projector.

Note that the display form of the display information brought about by the signage apparatus 30 may be, for example, AR (Augmented Reality) in which visual information generated by CG (Computer Graphics) or the like is displayed while being superimposed on an existent landscape of a place at which the signage apparatus is installed. Similarly, it is also allowable to use, for example, the projection mapping in which visual information generated by CG or the like is projected onto a building, an object, and/or a space disposed adjacently to a place at which the signage apparatus 30 is installed.

The vehicle onboard apparatus 20 is an apparatus which is loaded or carried on the vehicle V1. The vehicle V1, which carries the vehicle onboard apparatus 20, is previously registered in the management server 10 by a supplier or provider (hereinafter referred to as "user" as well) who supplies or provides the screen image photographed during the traveling. The user performs advanced registration in relation to the provision of the screen image, for example, by the aid of a terminal device such as a smartphone or the like possessed by the user himself/herself. In the first embodiment, the screen image of the vehicle traveling on the road around the vehicle V1 is photographed by the vehicle onboard apparatus 20 carried on the vehicle V1 which is traveling.

For example, an application program (hereinafter referred to as "application" as well), which is usable to register the information in relation to the provision of the screen image, is installed in the terminal device possessed by the user. The user registers, in the management server 10, the information in relation to the vehicle onboard apparatus 20 together with the user information in relation to the provision of the screen image by means of the execution of the application. The vehicle onboard apparatus 20, which is registered in the management server 10, periodically transmits, to the management server 10, the screen image in which the vehicle is traveling on the road, the screen image being photographed by the vehicle onboard apparatus as described later on. The management server 10 records the screen image transmitted from the vehicle onboard apparatus 20 in a predetermined database (DB).

The management server 10 according to the first embodiment acquires the screen image periodically transmitted from the vehicle onboard apparatus 20. Then, the management server 10 detects the vehicle which is traveling on the road and which is accompanied with the dangerous driving, on the basis of the acquired screen image. When the vehicle accompanied with the dangerous driving is detected, then the management server 10 generates the display content including the information in relation to the vehicle (for example, the screen image in which the vehicle is photographed), and the management server 10 outputs the display content to the signage apparatus 30. The display content includes, for example, a message (display information) of an advertiser who approves of the promotion of the safe driving. For example, the display information of the advertiser who approves of the promotion of the safe driving is displayed on the signage apparatus 30, for example, together with the information in relation to the vehicle which is accompanied with the dangerous driving. According to the first embodiment, the display information, which is generated as the content by sensing the phenomenon that occurs in real time, can be displayed on the signage apparatus. Therefore, it is possible to facilitate or advance the safe driving.

FIG. 2 explains detection of a vehicle accompanied with dangerous driving. In FIG. 2, the vehicle V1 is the vehicle which carries the vehicle onboard apparatus 20, and the vehicle V1 travels on a road R1 in the traveling direction indicated by the blanked arrow. The road R1 is a two-lane road in which the cruising lane is divided by a center line HM1 into those separated on the basis of the traveling directions. In FIG. 2A, preceding vehicles V2, V3 travel on the road R1 in front of the vehicle V1. Further, in FIG. 2B, a preceding vehicle V4 travels in front of the vehicle V1, and a vehicle V5 follows behind the vehicle V1.

In FIG. 2A, the nearest vehicle V2 travels while narrowing the distance (following distance) between two cars with respect to the preceding vehicle V3, while moving the traveling position on the road to the left and the right as illustrated by the broken line arrow. The vehicle onboard apparatus 20 photographs the screen image of the preceding vehicles V2, V3 which travel in front of the vehicle V1 at a predetermined frame cycle (for example, 30 fps). The screen image is transmitted to the management server 10.

The management server 10 specifies the preceding vehicles V2, V3 by means of, for example, the pattern matching for the frame image photographed at the predetermined frame cycle. Then, the behaviors of the vehicles V2, V3 in the screen image are detected on the basis of, for example, the optical flow involved in the time transition of the characteristic points of the vehicles V2, V3 between frame images. For example, those detected are the behavior of the vehicle V2 which travels while approaching the vehicle V3 behind the vehicle V3 and the behavior of the vehicle V2 which travels while moving the traveling position of the subject vehicle to the left and the right. The management server 10 specifies that the vehicle V2 is the vehicle accompanied with the dangerous driving such as the tailgating, on the basis of the detected behavior of the vehicle V2. For example, if the detected behavior fulfils such a condition that the following distance between the vehicle V2 and the vehicle V3 is not more than a threshold value and the distance between the vehicle V2 and the center line HM1 is not less than a threshold value, it is possible to estimate that the vehicle V2 involves the tailgating which causes the traffic danger.

In the next place, in FIG. 2B, a vehicle V5, which follows the vehicle V1, travels while narrowing the following distance with respect to the vehicle V1, while moving the traveling position on the road to the left and the right. The vehicle onboard apparatus 20 photographs the screen image of the vehicle V5 at a predetermined frame cycle, the vehicle V5 traveling while following the vehicle V1 behind the vehicle V1. The screen image is transmitted to the management server 10. Also in FIG. 2B, the behavior of the vehicle V5 is detected from the photographed screen image, in the same manner as in FIG. 2B. It is possible to estimate the tailgating of the vehicle V5 which travels while following the vehicle V1, on the basis of the behavior. As exemplified in FIGS. 2A and 2B, the behaviors of the vehicles V2, V5 accompanied with the tailgating are detected on the basis of the screen image in the frontward direction and the screen image in the backward direction photographed by the aid of the vehicle onboard apparatus 20.

FIGS. 3 and 4 explain other forms of detection of vehicles accompanied with dangerous driving. The road R1 and the vehicle V1 illustrated in FIG. 3 are the same as or equivalent to those illustrated in FIG. 2. In FIG. 3A, a preceding vehicle V6, which has a speed exceeding a speed limit, travels in front of the vehicle V1. The screen image of the vehicle V6 (vehicle V6 broken line vehicle V6a) traveling at the speed exceeding the speed limit is photographed by the vehicle onboard apparatus 20 which is carried on the vehicle V1 that follows the vehicle V6. The screen image is transmitted to the management server 10.

In the management server 10, the vehicle V6 in the screen image is specified by means of, for example, the pattern matching in the same manner as in FIG. 2. Then, the behavior of the vehicle in the screen image is detected on the basis of, for example, the optical flow involved in the time transition of the characteristic point of the vehicle V6 between frame images. For example, the behavior, which corresponds to the traveling speed of the vehicle V6, is detected from the range of change of the characteristic point between the frame images. In FIG. 3A, the traveling exceeding the speed limit is estimated on the basis of the behavior of the vehicle V6 in which the range of change exceeds a predetermined threshold value (for example, a range of change corresponding to the speed limit).

In the next place, in FIG. 3B, a vehicle V7 travels while following the vehicle V1. The vehicle V7 approaches the vehicle V1, and the vehicle V7 (broken line vehicle V7a) protrudes from the center line HM1 to the side of the opposite lane so that the vehicle V7 overtakes the vehicle V1. The vehicle V7 overtakes the vehicle V1 by changing the lane without flashing any turn signal, and the vehicle V7 travels while preceding the vehicle V1 on the cruising lane after the overtaking (broken line vehicle V7b). The vehicle onboard apparatus 20 photographs the screen image of the vehicle V7 (vehicle V7 broken line vehicle V7a) protruding to the side of the opposite lane without flashing any turn signal while approaching the vehicle V1. The screen image is transmitted to the management server 10. Further, the vehicle onboard apparatus 20 photographs the screen image of the vehicle V7 (broken line vehicle V7a broken line vehicle V7b) returning to the side of the cruising lane from the side of the opposite lane without flashing any turn signal. The screen image is transmitted to the management server 10.

In the management server 10, the vehicle V7 in the screen image is specified, and the behavior of the vehicle is detected in the same manner as in FIG. 2. For example, the broken line vehicle V7a is detected, which approaches the vehicle V1 from the backward position and which protrudes to the side of the opposite lane. Further, it is detected that the turn signal is not flashed when the lane is changed. Similarly, the broken line vehicle V7b is detected, which returns from the side of the opposite lane to the side of the cruising lane without flashing any turn signal. In FIG. 3B, the driving operation (steering operation, turn signal operation), which is involved in the overtaking traveling of the vehicle V7, is estimated from the detected behavior.

FIG. 4 exemplifies a vehicle V11 which travels on a road shoulder zone of the road R1 on which the traffic jam occurs. The vehicle V11 is, for example, a motorcycle. The vehicle V11 travels on the road shoulder zone disposed on the left side of the road R1 on which the vehicles V1, V8, V9, V10 travel, at a speed exceeding a traveling speed of, for example, the vehicle V1. The vehicle onboard apparatus 20, which is carried on the vehicle V1, photographs the screen image of the vehicle V11 which travels on the road shoulder zone, and the screen image is transmitted to the management server 10.

In the management server 10, the vehicle V11 in the screen image is specified, and the behavior of the vehicle is detected in the same manner as in FIG. 2. For example, the traveling speed of the vehicle V11 is detected, the vehicle V11 traveling while overtaking the vehicle V1 on the left side. Further, the traveling area of the vehicle V11 is detected from the structure (for example, gutter and white line) of the road shoulder zone. In FIG. 4, the traveling state of the vehicle V11 (for example, steering operation and traveling speed) is estimated from the detected behavior.

Note that the management server 10 can detect the attitude during the traveling of the motorcycle as the behavior from the photographed screen image of the motorcycle. For example, it is possible to detect the attitude of the motorcycle which performs the rear wheel travel (so-called wheelie travel) in a state in which the front wheel is allowed to float over the ground. Also in this case, the management server 10 can estimate the traveling state based on the attitude of the vehicle V11 which is the motorcycle, by the aid of the screen image photographed by the vehicle onboard apparatus 20.

FIGS. 5 and 6 are diagrams illustrating exemplary display screens displayed on the signage apparatus 30. The display screen illustrated in FIG. 5 is an exemplary form in which the position information of the position at which the vehicle has been detected and a message of an advertiser who approves of the promotion of the safe driving are displayed together with the screen image of the vehicle accompanied with the dangerous driving action.

In FIG. 5, the screen image of the vehicle accompanied with the dangerous driving action, which is photographed by the vehicle onboard apparatus 20 carried on the vehicle V1 that is traveling, is displayed in a display area 30a. For example, the screen image is displayed, in which the vehicle is photographed such that the vehicle approaches the preceding vehicle at the back of the preceding vehicle and the vehicle travels while moving the traveling position of the subject vehicle to the left and the right as explained with reference to FIG. 2A. Note that any masking process, for example, the shading or gradation may be applied to the information which specifies the vehicle or a driver who drives the vehicle, in the screen image displayed in the display area 30a. As for the information which specifies the driver, for example, any information, which makes it possible to specify an individual, is exemplified, including, for example, an image of the automobile registration number of the vehicle (number marked on the number plate or license plate) and a face image of the driver or a fellow passenger who rides together on a passenger seat. The management server 10 specifies the image area in which the foregoing information is photographed, from the screen image of the detected vehicle. The management server 10 applies the masking process such as the shading or gradation to the image area. Then, the management server 10 may display the screen image of the vehicle accompanied with the dangerous driving action applied with the masking process, in the display area 30a of the signage apparatus 30.

The map information, which indicates, for example, the traveling position of the vehicle accompanied with the dangerous driving action, is displayed as a still image in a display area 30*b*, The display area 30*b* may be a fixed area previously allotted to the signage apparatus 30. Alternatively, the display area 30*b* may be a partial area of the display area 30*a* to be displayed while being superimposed together with the screen image. The map information, which is displayed in the display area 30*b*, may include the traveling position and the movement history (30*c*) of the detected vehicle. The map information may include the information (30*d*) which indicates the position of the signage apparatus 30. Owing to the display of the map information, a reader of the signage apparatus 30 can visually recognize, for example, the route and the place of the traveling of the vehicle.

For example, a message and/or a slogan of the advertiser who approves of the promotion of the safe driving is displayed in a display area 30*e*, The display area 30*e* may be also a fixed area previously allotted to the signage apparatus 30. Alternatively, the display area 30*e* may be a partial area of the display area 30*a* to be displayed while being superimposed together with the screen image. In FIG. 5, a message of "T company promotes safe driving" is displayed in the display area 30***e*.

Further, in the first embodiment, the information to indicate the degree of danger, which is judged on the basis of the screen image of the vehicle when the vehicle accompanied with the dangerous driving action is detected, can be also displayed on the signage apparatus 30. FIG. 6 illustrates a display screen which is an example of such a form that the information to indicate the degree of danger of the vehicle is displayed together with the screen image of the vehicle for which the behavior accompanied with the dangerous driving is detected. Note that the display areas 30*a*, 30*b*, 30*c*, 30*d*, 30*e* illustrated in FIG. 6 are the same as or equivalent to those illustrated in FIG. 5.

In FIG. 6, the information to indicate the degree of danger, which relates to the vehicle displayed in the display area 30*a*, is displayed in the display area 30*f*, The display area 30*f* may be a fixed area previously allotted to the signage apparatus 30 in the same manner as the display area 30*b*, Alternatively, the display area 30*f* may be a partial area of the display area 30*a* to be displayed while being superimposed together with the screen image. The management server 10 judges the degree of danger of the vehicle detected on the basis of the screen image in which the vehicle is photographed. An obtained judgment result is outputted to the signage apparatus 30. The information to indicate the degree of danger can be expressed, for example, by an index (danger level) having a plurality of ranks such as "A", "B", "C" and the like corresponding to the detected behavior. In FIG. 6, the information, for example, "danger level", which is judged on the basis of the index having the plurality of ranks, is displayed in the display area 30***f*.

The degree of danger can be judged in accordance with the behavior of the vehicle in the photographed screen image. For example, if the behavior, which falls under the tailgating, is detected, the judgment is made such that the vehicle is in the state of "danger level A" in which the degree of danger is the highest. On the other hand, as for the vehicle having a speed exceeding a speed limit, if the speed of the vehicle exceeds a certain range (for example, 20 km/h with respect to the speed limit), the judgment can be made such that the vehicle is in the state of "danger level B". If the speed of the vehicle is within the certain range, the judgment can be made such that the vehicle is in the state of "danger level C". The condition, under which the degree of danger is judged as described above, may be previously retained in a software program. Note that the condition, under which the degree of danger is judged, can be also varied depending on, for example, the weather and the traffic environment including, for example, the expressway, the ordinary road, and the presence or absence of traffic jam.

(Hardware Configuration)

FIG. 7 is a diagram illustrating exemplary hardware configuration of each of the management server 10, the vehicle onboard apparatus 20, and the signage apparatus 30. The sponsor server 40 is omitted from FIG. 7, because the sponsor server 40 has hardware configuration which is the same as or equivalent to that of the management server 10.

The management server 10 is, for example, a general purpose or exclusive computer. The management server 10 is provided with constitutive components of a processor 101, a main storage unit 102, an auxiliary storage unit 103, and a communication unit 104 which are connected to one another by a bus. The main storage unit 102 and the auxiliary storage unit 103 are recording media which are readable by the management server 10. A plurality of constitutive components as described above may be provided respectively, and/or a part or parts of the constitutive components may not be provided. The processor 101 of the management server 10 is an example of the "controller".

The processor 101 is, for example, CPU (Central Processing Unit). The processor 101 executes the computer program developed executably in a working area of the main storage unit 102 to control the entire management server 10. The processor 101 provides the function which conforms to a predetermined purpose by controlling peripheral devices in accordance with the execution of the computer program. However, the processor 101 is not limited to any single processor. The processor 101 may be configured as a multiprocessor. Further, single CPU connected with a single socket may have multi-core configuration. Further, a part or parts of the processing function provided by the management server 10 may be provided, for example, by DSP (Digital Signal Processor), ASIC (Application Specific Integrated Circuit), or GPU (Graphics Processing Unit). Further, at least a part of the processing function may be FPGA (Field-Programmable Gate Array), exclusive LSI (large scale integration) such as a numeric data processor, a image processing processor or the like, another digital circuit, or another analog circuit.

The main storage unit 102 stores, for example, the computer program executed by the processor 101 and the data processed by the processor 101. The main storage unit 102 is, for example, a flash memory, RAM (Random Access Memory), or ROM (Read Only Memory). The auxiliary storage unit 103 is a nonvolatile storage device for readably and writably storing various programs and various data in the recording medium. The auxiliary storage unit 103 is also referred to as "external storage device". The auxiliary storage unit 103 is, for example, a flash memory, a hard disk drive (HDD), or SSD (Solid State Drive). For example, OS (Operating System) is included in various programs stored in the auxiliary storage unit 103. OS includes a communication interface program which delivers the data with respect to, for example, an external device connected via the communication unit 104.

The communication unit 104 is an interface with respect to the network N1. The communication unit 104 includes, for example, a LAN (Local Area Network) interface board and a wireless communication circuit for wireless communication. The management server 10 is connected to the network N1 via the communication unit 104, and the management server 10 makes communication, for example, with the vehicle onboard apparatus 20 and the signage apparatus 30 via the network.

Note that the hardware configuration of the management server 10 is not limited to the configuration illustrated in FIG. 7. For example, the management server 10 can read the program recorded on a transportable recording medium, develop the program in the main storage unit 102, and execute the program. The transportable recording medium is, for example, a disk recording medium such as a USB (Universal Serial Bus) memory, CD (Compact Disc), DVD (Digital Versatile Disc), or a Blu-ray (registered trademark) disk.

The vehicle onboard apparatus 20 has a processor 201, a main storage unit 202, an auxiliary storage unit 203, a display unit 204, an input unit 205, a communication unit 206, a position information detecting unit 207, a camera 208, and a vehicle speed sensor 209. The processor 201, the main storage unit 202, the auxiliary storage unit 203, and the communication unit 206 are the same as or equivalent to the processor 101, the main storage unit 102, the auxiliary storage unit 103, and the communication unit 104 of the management server 10, and hence any explanation thereof is omitted. A plurality of constitutive components as described above may be provided respectively, and/or a part or parts of the constitutive components may not be provided.

The display unit 204 is, for example, LCD (Liquid Crystal Display) or an EL (Electroluminescence) panel. Note that the display unit 204 may be provided with a speaker in order to announce, for example, a speech guidance and/or a message. The input unit 205 includes, for example, a touch panel or a push-button which makes it possible to input symbols such as letters or the like and/or a microphone which makes it possible to input a voice.

The position information detecting unit 207 detects the position information of the subject device (latitude, longitude), for example, on the basis of the GPS signal from a plurality of satellites of GPS (Global Positioning Satellite) orbiting around the earth. The position information detecting unit 207 acquires the detected position information at predetermined cycle intervals and records the position information while being correlated with the time information. The information, which is recorded by the position information detecting unit 207, is transmitted via the communication unit 206 to the management server 10 connected to the network N1 periodically or in response to the request of the management server 10.

Note that the vehicle onboard apparatus 20 may be, for example, in such a form that the vehicle onboard apparatus 20 cooperates with a navigation device or the like carried on the vehicle driven by a user or a target person. In this case, for example, a display unit and an input unit, which are included in the navigation device or the like, can be allotted to constitutive components which can be used in a shared manner. Further, a GPS receiving unit, which is included in the navigation device or the like, can be allotted to the position information detecting unit 207.

The camera 208 is a photographing device based on, for example, an image sensor such as CCD (Charged-Coupled Devices), CMOS (Complementary Metal-Oxide-Semiconductor) or the like. The camera 208 may be either a monocular (single-lens) camera or a stereo camera. Further, the camera 208 may be an infrared camera. The camera 208 photographs the screen image in an angle of view (horizontal angle of view, vertical angle of view, diagonal angle of view) at a predetermined frame cycle. For example, the screen images in the front direction (traveling direction) and the back direction of the vehicle and the screen images around the vehicle are photographed by the aid of the camera 208. The screen image, which is photographed by the camera 208, is recorded, for example, in the auxiliary storage unit 203. The screen image, which is photographed by the camera 208, is transmitted to the management server 10 connected to the network N1 via the communication unit 206, for example, together with the position information of the vehicle V1, the speed information, and the time information periodically or in response to the request of the management server 10. The vehicle onboard apparatus 20 transmits the information as described above to the management server 10 together with the identification information of the subject device or apparatus.

Note that the vehicle onboard apparatus 20 can cooperate with, for example, a drive recorder which is carried on the vehicle V1 so that the external screen image information, which is photographed by the aid of an image pickup unit provided for the driver recorder or the like, can be acquired as well. The vehicle onboard apparatus 20 may acquire the external screen image information photographed by the driver recorder or the like, for example, by the aid of an internal network of the vehicle such as CAN (Controller Area Network) or the like.

The vehicle speed sensor 209 is the sensor which detects the speed of the vehicle V1, for example, on the basis of the vehicle speed signal generated in accordance with the number of revolutions of the axle. The speed information of the photographed vehicle V1, which is detected by the vehicle speed sensor 209, is recorded in the auxiliary storage unit 203 or the like, for example, together with the time information. The speed information is transmitted to the management server 10 together with the position information and/or the screen image photographed by the camera 208.

The signage apparatus 30 includes a processor 301, a main storage unit 302, an auxiliary storage unit 303, a display unit 304, and a communication unit 305. Explanation of the processor 301, the main storage unit 302, and the auxiliary storage unit 303 is omitted, because the explanation is the same as or equivalent to the explanation of the processor 101, the main storage unit 102, and the auxiliary storage unit 103 of the management server 10. Further, explanation of the display unit 304 and the communication unit 305 is omitted, because the explanation is the same as or equivalent to the explanation of the display unit 204 and the communication unit 206 of the vehicle onboard apparatus 20. However, as explained with reference to FIG. 1, the display unit 304 includes constitutive components of, for example, an LED matrix and a projector. Further, the display unit 304 may be provided integrally with the casing of the signage apparatus 30. Alternatively, the display unit 304 may be provided separately from the casing of the signage apparatus 30.

(Functional Configuration)

FIG. 8 is a diagram illustrating exemplary functional configuration of the management server 10. The management server 10 includes, as functional constitutive components, an accepting unit 11, a registering unit 12, an image information acquiring unit 13, an image processing unit 14, and a display information output unit 15. Further, the management server 10 includes, as other functional constitutive components, a signage apparatus database (DB) 16, a display information DB 17, a user information DB 18, a map information DB 19, an image information DB 1A, a collation pattern DB 1B, and a vehicle screen image DB 1C. The map information DB 19 stores the map data which includes the planimetric feature positions, and the POI (Point of interest) information such as a letter, a photograph or the like which indicates the characteristic of each of the points on the map data. Note that the map information DB 19 may be provided from any other system connected to the network N1, for example, GIS (Geographic Information System). The functional constitutive components as described above are the functional constitutive components which are provided, for example, such that the processor 101 of the management server 10 executes various programs stored in the auxiliary storage unit 103. However, any one of the respective functional constitutive components or a part of the process thereof may be executed by a hardware circuit. Further, any one of the respective functional constitutive components or a part of the process thereof may be executed by any other computer connected to the network N1.

The accepting unit 11 accepts the display information which is requested to be displayed on the signage apparatus 30 by the advertiser who approves of the promotion of the safe driving by the aid of the sponsor server 40. The display information includes still images, moving images, display contents of slide shows, slogans proposed by public organizations such as local governments and the like, and messages of enterprises and the like which approve of the promotion of the safe driving. The accepting unit 11 stores the accepted display information in the display information DB 17.

FIG. 9 is a diagram illustrating exemplary display information stored in the display information DB 17. As exemplified in FIG. 9, the display information, which is accepted via the accepting unit 11, is managed as a display information table. Note that addition, change, and deletion of the field can be appropriately performed for the information registered in the display information table.

The display information table exemplified in FIG. 9 has respective fields of "advertiser ID", "area ID", "apparatus ID", "installation position", "display information number", "display data", "message information", "display term", "time zone", and "classification". Identification information (for example, an entrepreneur code or the like), which identifies the advertiser, is stored in the advertiser ID field. Information (area ID), which indicates the area in which the signage apparatus 30 is installed, is stored in the area ID field. Identification information of the signage apparatus 30 is stored in the apparatus ID field. Position information (latitude, longitude) of the point at which the signage apparatus 30 is installed is stored in the installation position field.

An identification number, which indicates display data displayed as the display information, is stored in the display information number field. An exclusive identification number, which is provided to display the image of the vehicle when the vehicle accompanied with the dangerous driving action is detected, is included in the identification number. In FIG. 9, "PPPPPP" is exemplified as the exclusive identification number by way of example. Note that if the exclusive identification number is stored in the field, the message stored in the message information field is displayed together with the screen image of the vehicle described above.

The data of the display content is stored in the display data field. A message, which is designated by the advertiser, is stored as letter information in the message information field. The message is displayed on the signage apparatus 30 together with the screen image of the vehicle accompanied with the dangerous driving action. Note that an identification number, which identifies letter information stored in another table or the like, may be stored in place of the letter information. Further, if any message to be displayed is absent, information (for example, "- - -", blank space or the like), which indicates that the message is absent, is stored.

Information, which indicates the term for displaying the display information, is stored in the display term field. Information, which indicates the time zone for displaying the display information, is stored in the time zone field. In FIG. 9, a term ranging from "2018/04/01" to "2018/04/28" is exemplified for apparatus ID "D00A". Further, a time zone designated by "11:00-14:00" is stored for a display information number "P000A1" of the concerning apparatus ID. Information, which indicates the display form of the content displayed as the display information, is stored in the classification field. For example, still image, slide show, and moving image are exemplified as the display form of the content. Note that, for example, Projection Mapping and AR (Augmented Reality) including visual information generated by CG (Computer Graphics) or the like as the content may be included in the display form.

Note that the signage apparatus 30 for displaying the display information is managed by the signage apparatus DB 16. The signage apparatus DB 16 is provided with, for example, records for respective apparatus ID's of the signage apparatuses 30. The information (administrator ID) which indicates the administrator of the signage apparatus 30, the information which indicates the term of contract in relation to the use of the signage apparatus 30, the area ID, and the position information (latitude, longitude) of the installation place are stored in the record. Further, the information which indicates the display form capable of being displayed (for example, still image, slide show, and moving image) and the restriction or limitation concerning the display (for example, term in which display is prohibited) are stored in the record.

The registering unit 12 registers, in the user information DB 18, the information concerning the vehicle onboard apparatus 20 and the user information concerning the provision of the screen image as accepted via the terminal device upon the download of the application. The user information DB 18 is provided with, for example, records for respective pieces of identification information (user ID's) for unambiguously identifying the users. The full name of the user, the distinction of sex, the identification information (for example, IP address or the like) of the terminal device downloaded with the application, and the identification information (for example, IP address, MAC address or the like) for identifying the vehicle onboard apparatus 20 of the user are stored in the record.

The image information acquiring unit 13 acquires the image information transmitted from the vehicle onboard apparatus 20, and the image information is stored in the image information DB 1A. The image information includes the screen image photographed by the camera 208 of the vehicle onboard apparatus 20 at constant cycle intervals, the position information of the vehicle V1, the speed information, and the time information. The image information acquiring unit 13 stores the image information in the image information DB 1A together with the identification information of the vehicle onboard apparatus 20.

FIG. 10 is a diagram illustrating exemplary image information stored in the image information DB 1A. The image information, which is accepted by the aid of the image information acquiring unit 13, is managed as an image information table for each user ID as exemplified in FIG. 10. Addition, change, and deletion of the field can be appropriately performed for the information registered in the image information table.

The image information table exemplified in FIG. 10 has respective fields of "acquisition No.", "date and time of acquisition", "image information", and "processing status". The acquisition number, which is given when the image information is accepted, is stored in the acquisition No. field. The information, which indicates the date and time at which the image information is accepted, is stored in the date and time of acquisition field. The image information, which is periodically transmitted from the vehicle onboard apparatus 20, is stored in the image information field. The image information field has subfields of "screen image", "position", and "speed". Data numbers of the screen image information, the position information, and the speed information included in the image information are stored in the respective subfields. The information, which indicates the completion of the image processing performed by the image processing unit 14, is stored in the processing status field. For example, if the image processing is not completed, the information (for example, "blank space"), which indicates the uncompleted state, is stored. If the image processing is completed, the information, which is "completed" or the like, is stored.

The image processing unit 14 illustrated in FIG. 8 detects the vehicle which is traveling on the road and which is accompanied with the dangerous driving, on the basis of the screen image acquired from the vehicle onboard apparatus 20. The image processing unit 14 specifies the vehicle and the structure (for example, road marking such as roadway outer side line, centerline or the like, gutter, and post) photographed in the screen image, for example, by means of the pattern matching. The pattern matching is performed by making reference to the collation pattern DB 1B. The collation pattern data, which is provided to specify the behavior of the vehicle, is stored in the collation pattern DB 1B.

The image processing unit 14 detects the behavior of the vehicle in the screen image on the basis of, for example, the optical flow involved in the time transition of the specified vehicle. The image processing unit 14 specifies that the vehicle is the vehicle which is accompanied with the dangerous driving, on the basis of the detected behavior. Further, the image processing unit 14 judges the degree of danger in relation to the driving action of the vehicle on the basis of the detected behavior. The image processing unit 14 stores the screen image of the vehicle accompanied with the dangerous driving in the vehicle screen image DB 1C together with the information which indicates the degree of danger and the position information of the place at which the vehicle is photographed. Further, the image processing unit 14 records the information (for example, "completed") which indicates the completion of the process in the processing status field of the image information for which the image processing is completed, the processing status field being stored in the image information DB 1A.

FIG. 11 is a diagram illustrating exemplary vehicle screen image information stored in the vehicle screen image DB 1C. The screen image information of the vehicle specified by the image processing unit 14 is managed as a vehicle screen image information table as exemplified in FIG. 11. Addition, change, and deletion of the field can be appropriately performed for the information registered in the vehicle screen image information table.

The vehicle screen image information table exemplified in FIG. 11 has respective fields of "display management No.", "date and time of acquisition", "screen image", "vehicle information", and "danger level". The date and time of acquisition is omitted from explanation, because the date and time of acquisition is the same as or equivalent to that of the image information table illustrated in FIG. 10.

The number for managing the vehicle information is stored in the display management No. field. The display management No. is managed as consecutive numbers or serial numbers. The display management number, which is continued to the number given to the nearest vehicle information, is given to the screen image information by the image processing unit 14 when the screen image information is registered, and the display management number is stored in the vehicle screen image information table. The data number of the screen image information which is the object or target of the image processing is stored in the screen image field.

The vehicle information of the vehicle accompanied with the dangerous driving is stored in the vehicle information field. The vehicle information field has respective subfields of "term", "data", "vehicle number", "face information", and "classification of action". The information, which indicates the term in which the screen image of the vehicle accompanied with the dangerous driving is photographed in relation to the screen image as the processing object, is stored in the term subfield. The data of the term, in which the screen image of the vehicle accompanied with the dangerous driving is photographed, is stored in the data subfield. The automobile registration number (number marked on the number plate or license plate), which is specified from the screen image of the processing object, is stored in the vehicle number subfield. Note that, if the number marked on the license plate is not specified, the information (for example, "- - - ", blank space or the like), which indicates that the number is not specified, is stored.

The information, which indicates the presence or absence of the existence of the face information capable of specifying the private information or personal information in the screen image as the processing object, is stored in the face information subfield. For example, if any face image of a driver who drives the vehicle and/or a fellow passenger who sits on a passenger seat is present, the information of "present" or the like is stored. On the other hand, if the face image is not present, the information of "absent" or the like is stored.

The information, which indicates the classification of the driving action accompanied with the danger as estimated from the behavior of the vehicle, is stored in the classification of action subfield. Those stored are, for example, the tailgating, the overspeed driving, the overtaking driving, the illegal driving without practicing any sign and without flashing any turn signal, the traveling on the road shoulder zone, and the rear wheel travel (wheelie), as explained with reference to FIGS. 2 to 4. The information, which indicates the degree of danger of the driving action, is stored in the danger level field. For example, pieces of the information, which correspond to three ranks, i.e., "A", "B", and "C" ranks, are stored.

With reference to FIG. 8 again, the display information output unit 15 outputs the display information (for example, display data, slogan or the like) registered in the display information DB 17 to the corresponding signage apparatus 30 on the basis of the designated display term and the time zone. Further, the screen image of the vehicle accompanied with the dangerous driving stored in the vehicle screen image DB 1C is extracted and outputted to the signage apparatus 30. The extracted screen image of the vehicle is displayed together with the position information which indicates the traveling position, the information which indicates the degree of danger of the driving action, and the previously determined message information. Note that the display information output unit 15 adjusts the display scheduling between the display information which is registered in the display information DB 17 and the screen image which is stored in the vehicle screen image DB 1C so that the display is performed on the signage apparatus 30. Details of the display information output unit 15 will be described later on.

(Process flow)

Next, an explanation will be made about the process of the management server 10 according to the first embodiment with reference to FIGS. 12 to 16. FIG. 12 is a flow chart illustrating an exemplary process for acquiring image information. In the flow chart illustrated in FIG. 12, the start of the process is exemplified by a timing at which the image information transmitted from the vehicle onboard apparatus 20 is accepted. The management server 10 acquires the image information transmitted from the vehicle onboard apparatus 20 (S1). Note that, for example, the speed and the acceleration of the opponent vehicle may be acquired in combination by means of a vehicle onboard radar. The management server 10 temporarily stores the image information in a predetermined area of the main storage unit 102 together with the identification information (for example, IP address or MAC address) of the vehicle onboard apparatus 20 and the accepted time information, and the management server 10 proceeds to the process of S2.

The management server 10 extracts the screen image information, the position information, and the speed information included in the image information (S2). Then, the management server 10 makes reference to the user information DB 18 to specify the user ID of the user corresponding to the identification information of the vehicle onboard apparatus 20 (S3). The specified user ID is delivered to the process of S4.

In the process of S4, the screen image information, the position information, and the speed information, which are included in the acquired screen image, are recorded in the image information DB 1A, while being correlated with the user ID. The management server 10 specifies, for example, the image information table corresponding to the user ID stored in the image information DB 1A. Then, the record, in which the image information as the processing object is to be stored, is generated in the image information table. An acquisition number, which is continued to the acquisition number of the nearest record, is given to the record of the processing object. The management server 10 stores the accepted time information, the data number of the screen image information, the data number of the position information, and the data number of the speed information in the corresponding fields of the record. Note that the processing status field is in the state of "blank space". After the process of S4, the process illustrated in FIG. 12 is terminated.

According to the process as described above, the management server 10 can acquire the image information which is periodically transmitted from the vehicle onboard apparatus 20 carried on the traveling vehicle V1. The image information includes the screen image photographed by the camera 208 provided for the vehicle onboard apparatus 20 and the position information and the vehicle speed information of the vehicle V1 detected at constant cycle intervals. The management server 10 can specify the user ID on the basis of the identification information of the vehicle onboard apparatus 20. Further, the management server 10 can give the acquisition number to the acquired image information and record the image information in the image information DB 1A.

Next, an explanation will be made about the processes illustrated in FIGS. 13 and 14. FIGS. 13 and 14 are flow charts each illustrating an exemplary image processing. The process illustrated in FIGS. 13 and 14 is periodically executed with respect to the record in which the processing status field is in the "blank space" state in the image information DB 1A. In accordance with the process illustrated in FIGS. 13 and 14, the vehicle, which is accompanied with the dangerous driving action based on the behavior of the vehicle as explained with reference to FIGS. 2 to 4, is specified. Note that the process illustrated in FIGS. 13 and 14 is the exemplary process in which the tailgating, the overspeed driving, the illegal driving without practicing any sign, the traveling on the road shoulder zone, and the rear wheel travel (wheelie) are judged into those of three ranks, i.e., "A", "B", and "C" ranks.

In the flow chart illustrated in FIG. 13, the management server 10 makes reference to the image information DB 1A to extract the record of the processing object (S11). The extracted record is temporarily stored in a predetermined area of the main storage unit 102. The management server 10 acquires the image information stored in the record (S12). However, if the management server 10 acquires the image from the drive recorder of the vehicle V1, it is also allowable to acquire the information of, for example, the speed and the acceleration of the opponent vehicle as obtained with the vehicle onboard radar in combination. The management server 10 specifies the traffic environment of the road photographed by the vehicle onboard apparatus 20 on the basis of the image information (S13).

The management server 10 makes reference, for example, to the collation pattern DB 1B to specify the vehicle and the structure (for example, road marking such as roadway outer side line, centerline or the like, gutter, post, and road sign) photographed in the frame image photographed at a predetermined frame cycle, by means of the pattern matching. Then, the management server 10 detects the behavior of the vehicle in the screen image on the basis of, for example, the optical flow involved in the time transition of the characteristic point of the specified vehicle (S14). However, for example, the information of the speed, the acceleration or the like of the opponent vehicle obtained by a vehicle onboard radar may be utilized to detect the behavior of the vehicle.

The management server 10 judges whether or not the detected behavior of the vehicle is in the dangerous driving state (S15). The management server 10 judges that the vehicle is in the dangerous driving state, for example, if the speed and/or the acceleration of the vehicle, which is/are detected from the change in the screen image in accordance with the time transition of the vehicle, exceed(s) a predetermined threshold value or predetermined threshold values. Similarly, it is judged that the vehicle is in the dangerous driving state if the relative distance with respect to another vehicle traveling ahead or behind the vehicle is not more than a predetermined threshold value, if the signal is not flashed when the lane is changed, if the traveling is performed in a traveling restricted area or the rear wheel travel (wheelie) is performed, and/or if the frequency of change of the cruising lane is a certain frequency.

If the detected behavior of the vehicle is in the dangerous driving state (S15, "Yes"), the management server 10 proceeds to the process of S16. On the other hand, if the detected behavior of the vehicle is not in the dangerous driving state (S15, "No"), the management server 10 proceeds to the process of S19.

In the process of S16, the degree of danger of the vehicle involved in the dangerous driving is judged. Details of the process of S16 will be explained by using a flow chart illustrated in FIG. 14.

With reference to the flow chart illustrated in FIG. 14, in the process of S21, it is judged whether or not the behavior of the vehicle is the tailgating. The management server 10 judges that the behavior of the vehicle falls under the tailgating, for example, if such a state continues that the relative distance with respect to the vehicle which follows the subject vehicle or the relative distance with respect to another vehicle which precedes the vehicle is shorter than the distance (following distance) between two cars corresponding to the traveling speed. The traveling speed is judged, for example, on the basis of the road marking and/or the road sign to indicate the speed limit and/or the speed information. Note that the judgment condition may include the flashing frequency of the tail light and/or the movement of the traveling position with respect to the center line and/or the roadway outer side line.

If the management server 10 judges that the behavior of the vehicle is the tailgating (S21, "Yes"), it is judged that the degree of danger is "danger level "A" rank" (S22), for the following reason. That is, it is possible to judge that the tailgating action is the action in which the probability to cause any accident is high. The judged degree of danger is delivered to the process of S18 illustrated in FIG. 13 together with the information of the dangerous driving described above.

On the other hand, if the management server 10 judges that the behavior of the vehicle is not the tailgating (S21, "No"), the management server 10 proceeds to the process of S23. In the process of S23, it is judged whether or not the behavior of the vehicle is the overspeed driving. For example, if the traveling speed of the vehicle exceeds the speed limit, the management server 10 judges that the behavior of the vehicle falls under the overspeed driving. The traveling speed is judged on the basis of, for example, the road marking and/or the road sign to indicate the speed limit and/or the speed information. If the management server 10 judges that the behavior of the vehicle is the overspeed driving (S23, "Yes"), the management server 10 proceeds to the process of S24. On the other hand, if the management server 10 judges that the behavior of the vehicle is not the overspeed driving (S23, "No"), the management server 10 proceeds to the process of S26.

In the process of S24, it is judged whether or not the overspeed is within a predetermined range. For example, 20 km/h is exemplified as the predetermined range of the overspeed. If the traveling speed of the vehicle is less than 20 km/h with respect to the speed limit (S24, "Yes"), then the management server 10 judges that the overspeed is within the predetermined range, and the management server 10 proceeds to the process of S28. On the other hand, if the traveling speed of the vehicle is not less than 20 km/h with respect to the speed limit (S24, "No"), then the management server 10 judges that the overspeed is not within the predetermined range, and the management server 10 judges that the degree of danger is "danger level "B" rank" (S25), for the following reason. That is, it is possible to judge that the overspeed of not less than 20 km/h with respect to the speed limit has a fear of occurrence of any accident relevant to the human life. The judged degree of danger is delivered to the process of S18 illustrated in FIG. 13 together with the information of the dangerous driving described above.

In the process of S26, it is judged whether or not the behavior of the vehicle is the traveling on the road shoulder zone. For example, if the traveling position of the vehicle is positioned in an outer area with respect to the roadway outer side line, the management server 10 judges that the road shoulder zone traveling is performed. If the management server 10 judges that the behavior of the vehicle is the road shoulder zone traveling (S26, "Yes"), the management server 10 judges that the degree of danger is "danger level "B" rank" (S25), for the following reason. This, it is possible to judge that the road shoulder zone traveling has a fear of occurrence of any accident relevant to the human life. The judged degree of danger is delivered to the process of S18 illustrated in FIG. 13 together with the information of the dangerous driving described above.

On the other hand, if the management server 10 judges that the behavior of the vehicle is not the road shoulder zone traveling (S26, "No"), the management server 10 judges that the vehicle performs the rear wheel travel (wheelie) or the driving without practicing any sign without flashing any turn signal (S27). The rear wheel travel (wheelie) is judged when the attitude during the traveling is in a state in which the front wheel floats over the ground. Further, the driving without practicing any sign can be judged on the basis of the presence or absence of the flashing of the turn signal. If the behavior of the vehicle falls under the rear wheel travel (wheelie), the driving without practicing any sign, or the overspeed driving of less than 20 km/h with respect to the speed limit, the management server 10 judges that the degree of danger is "danger level "C" rank" (S28), for the following reason. That is, it is possible to judge that although there is a fear of occurrence of any accident, the degree of danger is relatively low as compared with other dangerous driving actions. The judged degree of danger is delivered to the process of S18 illustrated in FIG. 13 together with the information of the dangerous driving described above.

In the process of S29, the management server 10 judges whether or not the vehicle number (automobile registration number) of the vehicle accompanied with the dangerous driving action is specified. The vehicle number is specified by reading the information indicated on the license plate of the vehicle when the vehicle is specified. If the vehicle number is specified (S29, "Yes"), the management server 10 acquires the vehicle number (S2A). The acquired vehicle number is delivered to the process of S18 illustrated in FIG. 13. On the other hand, if the vehicle number is not specified (S29, "No"), the management server 10 proceeds to the process of S2B.

In the process of S2B, it is judged whether or not the face image capable of specifying the private information or personal information is present in the screen image of the vehicle. If the face image is present (S2B, "Yes"), the management server 10 delivers the information "present" to indicate the presence of the face image in the screen image of the vehicle, to the process of S18 illustrated in FIG. 13 (S2C). On the other hand, if the face image is absent (S2B, "No"), the management server 10 delivers the information "absent" to indicate the absence of the face image in the screen image of the vehicle, to the process of S18 illustrated in FIG. 13 (S2D). After the process of S2C or S2D, the management server 10 proceeds to the process of S17 illustrated in FIG. 13.

In the process of S17, the management server 10 extracts the screen image in the term in which the behavior of the vehicle judged to be in the dangerous driving state is photographed. The extracted screen image of the vehicle is delivered to the process of S18. In the process of S18, the management server 10 records, in the vehicle screen image DB 1C, the screen image in the term in which the behavior of the vehicle judged to be in the dangerous driving state is photographed. The screen image of the vehicle is stored in the vehicle screen image DB 1C together with the information of the dangerous driving, the information to indicate the degree of danger, the vehicle number information, and the information about the presence or absence of the face image. After the process of S19, the process illustrated in FIGS. 13 and 14 is terminated.

According to the process as described above, the management server 10 can specify the vehicle photographed in the screen image and detect the behavior of the vehicle on the basis of the image information transmitted from the vehicle onboard apparatus 20. Then, the management server 10 can judge whether or not the vehicle is in the dangerous driving state, from the information which indicates the detected behavior of the vehicle. The management server 10 can detect that the vehicle is in the dangerous driving state of the overspeed, for example, from the information which indicates the speed and/or the acceleration of the vehicle. Further, the management server 10 can detect that the vehicle is in the dangerous driving state of the tailgating from the information which indicates the distance between the vehicle and another vehicle traveling ahead or behind the vehicle. Furthermore, the management server 10 can detect that the vehicle is in the dangerous driving state of the rear wheel travel (wheelie) from the information which indicates the attitude of the traveling vehicle and that the vehicle is in the dangerous driving state of the road shoulder zone (traveling restricted area) traveling from the information which indicates the traveling area of the vehicle. Moreover, the management server 10 can detect that the vehicle is in the dangerous driving state of the driving without practicing any sign from the information which indicates the flashing state of the turn signal of the vehicle.

Further, the management server 10 can judge the degree of danger for the vehicle which is in the dangerous driving state, and the management server 10 can give the index corresponding to the degree. The management server 10 can specify the automobile registration number indicated on the license plate of the vehicle which is in the dangerous driving state. The management server 10 can record, in the vehicle screen image DB 1C, the information of the corresponding dangerous driving, the index to indicate the degree of danger, and the automobile registration number of the vehicle, together with the screen image in the term in which the behavior of the vehicle judged to be in the dangerous driving state is photographed.

Next, the process illustrated in FIG. 15 will be explained. FIG. 15 is a flow chart illustrating an exemplary process for outputting the display information. The process illustrated in FIG. 15 is periodically executed for each of apparatus ID's registered in the display information DB 17.

In the flow chart illustrated in FIG. 15, the management server 10 makes reference to the display information DB 17 to extract the record corresponding to the apparatus ID of the processing object (S31). The extracted record is temporarily stored in a predetermined area of the main storage unit 102. The management server 10 acquires respective pieces of information of the display term of the display information and the time zone from the extracted record of the apparatus ID (S32).

The management server 10 judges whether or not the present date is in the display term (S33). If the present date is in the display term (S33, "Yes"), the management server 10 proceeds to the process of S34. On the other hand, if the present date is not in the display term (S33, "No"), the management server 10 terminates the process illustrated in FIG. 15.

In the process of S34, the management server 10 judges whether or not the present time is in the display time zone. If the present time is in the display time zone (S34, "Yes"), the management server 10 proceeds to the process of S35. On the other hand, if the present time is not in the display time zone (S34, "No"), the management server 10 terminates the process illustrated in FIG. 15.

In the process of S35, the management server 10 acquires the display data from the extracted record of the apparatus ID. Then, the management server 10 outputs the acquired display data to the signage apparatus 30 designated by the apparatus ID (S36). The signage apparatus 30 displays the display information (display data of the content) outputted from the management server 10 on the display unit 304. After the process of S36, the process illustrated in FIG. 15 is terminated.

According to the process as described above, the management server 10 can display the display information registered in the display information DB 17 on the signage apparatus 30 in accordance with the designated term and the time zone. The management server 10 can display, on the signage apparatus 30, the content such as any slogan or motto for the safety registered in the display information DB 17 in accordance with the time zone in such a manner that the display is performed separately depending on the time zone.

Next, the process illustrated in FIG. 16 will be explained. FIG. 16 is a flow chart illustrating an exemplary process for outputting the screen image of the vehicle accompanied with the dangerous driving recorded in the vehicle screen image DB 1C. The process illustrated in FIG. 16 is periodically executed.

In the flow chart illustrated in FIG. 16, the management server 10 makes reference to the vehicle screen image DB 1C to extract the record of the processing object (S41). The extracted record is temporarily stored in a predetermined area of the main storage unit 102. The management server 10 acquires the information of date and time of acquisition from the extracted record (S42).

The management server 10 judges whether or not the present date is the day of acquisition (S43). If the present date is the day of acquisition (S43, "Yes"), the management server 10 proceeds to the process of S44. On the other hand, if the present date is not the day of acquisition (S43, "No"), the management server 10 proceeds to the process of S41.

In the process of S44, the management server 10 acquires the data number of the screen image information from the extracted record. The management server 10 makes reference to the screen image information DB 1A to acquire the position information (information of the position) at which the screen image is photographed (S45). The management server 10 acquires the position information of the record in which the data number is stored. Then, the management server 10 extracts the signage apparatus 30 on which the vehicle screen image is to be displayed, from the display information DB 17 on the basis of the position information (S46). For example, the record of the signage apparatus 30 installed for the area ID corresponding to the position information is extracted. The management server 10 temporarily stores the extracted record in a predetermined area of the main storage unit 102, and the management server 10 proceeds to the process of S47.

In the process of S47, the management server 10 acquires the message information which is to be displayed together with the vehicle screen image, from the extracted record. Then, the management server 10 acquires the danger level information and the screen image data of the record extracted from the vehicle screen image DB 1C (S48). The management server 10 judges the rank of the danger level for the vehicle judged to be in the dangerous driving state (S49).

If the rank of the danger level is "A" (S49, "Yes"), the management server 10 proceeds to the process of S4A. On the other hand, if the rank of the danger level is not "A" (S49, "No"), the management server 10 proceeds to the process of S4B. In the process of S4A, the vehicle information, which includes the screen image data of the vehicle accompanied with the dangerous driving, the danger level information, the message information, and the position information, is outputted to the signage apparatus 30 as the processing object. The vehicle information is outputted to the signage apparatus 30 as the processing object together with the instruction to interrupt the content which is being displayed so that the vehicle information is preferentially displayed. The outputted vehicle information is preferentially displayed on the signage apparatus 30 in accordance with the instruction of the management server 10. After the process of S4A, the management server 10 proceeds to the process of S4C.

Also in the process of S4B, the vehicle information, which includes the screen image data of the vehicle accompanied with the dangerous driving, the danger level information, the message information, and the position information, is outputted to the signage apparatus 30 as the processing object. However, the vehicle information is outputted to the signage apparatus 30 as the processing object together with the instruction to wait for the termination of the content which is being displayed so that the vehicle information is displayed. The outputted vehicle information is displayed on the signage apparatus 30 after waiting for the termination of the content which is being displayed, in accordance with the instruction of the management server 10. After the process of S4B, the management server 10 proceeds to the process of S4C.

In the process of S4C, the management server 10 judges whether or not any unprocessed signage apparatus 30 is present in relation to the signage apparatuses 30 extracted in the process of S46. If any unprocessed signage apparatus 30 is present (S4C, "Yes"), the management server 10 proceeds to the process of S47. On the other hand, if any unprocessed signage apparatus 30 is not present (S4C, "No"), the management server 10 terminates the process illustrated in FIG. 16.

According to the process as described above, the management server 10 can output, to the signage apparatus 30, the screen image of the vehicle accompanied with the dangerous driving as record in the vehicle screen image DB 1C. The management server 10 can output the message information of the advertiser displayed together with the screen image of the vehicle. Further, the management server 10 can output, to the signage apparatus 30, the position information in which the screen image of the vehicle accompanied with the dangerous driving is photographed and the information which indicates the degree of danger of the dangerous driving. The signage apparatus 30 can display the screen image of the vehicle accompanied with the dangerous driving action in the display area 30*a* as explained with reference to FIGS. 5 and 6.

Similarly, the traveling position and the movement history (30*c*) of the vehicle can be displayed in the display area 30*b* together with the map information which indicates the traveling position of the vehicle accompanied with the dangerous driving action. Further, the message of the advertiser who approves of the promotion of safe driving can be displayed in the display area 30*e*, The information, which indicates the degree of danger of the vehicle accompanied with the dangerous driving action, can be displayed in the display area 30*f*, The information, which indicates the degree of danger, can be displayed while being classified into those having levels of a plurality of ranks. Note that the management server 10 can output the instruction in order that the content, which is being displayed, is interrupted in accordance with the rank of the information which indicates the degree of danger so that the vehicle information is preferentially displayed. According to the first embodiment, it is possible to provide the technique in order that the safe driving is advanced by sensing the phenomenon which occurs in real time and displaying, on the signage apparatus, the display information which is generated as the content.

Second Embodiment

As illustrated in FIG. 17, the second embodiment is such an embodiment that a camera 306 is included as a constitutive component of a signage apparatus 30. In the second embodiment, a screen image of a vehicle which is traveling on the road and which is accompanied with the dangerous driving is photographed by means of the camera 306. The camera 306 of the signage apparatus 30 is the same as or equivalent to the camera 208 provided for the vehicle onboard apparatus 20 of the first embodiment. Typically, the camera 306 is integrally provided on the casing of the signage apparatus 30, and the camera 306 photographs the screen image of the road around the signage apparatus at a predetermined frame cycle. However, the camera 306 may be provided separately from the casing of the signage apparatus 30. For example, the camera 306 may be provided at a position opposed to the signage apparatus 30 while allowing the road intervening therebetween, or the camera 306 may be provided, for example, on a footbridge (pedestrian bridge). The screen image, which is photographed by the camera 306, is recorded, for example, in the auxiliary storage unit 303. The screen image is transmitted periodically or in response to the request of the management server 10 to the management server 10 connected to the network N1 by the aid of the communication unit 305.

The management server 10 specifies the vehicle and the structure (for example, road marking such as roadway outer side line, centerline or the like, gutter, post, and road sign), for example, by means of the pattern matching for the frame image photographed at the predetermined frame cycle in the same manner as the first embodiment. Then, it is possible to detect the behavior of the vehicle in the screen image on the basis of, for example, the optical flow involved in the time transition of the characteristic point of the specified vehicle.

Also in the second embodiment, it is possible to provide the technique in order that the safe driving is advanced by sensing the phenomenon which occurs in real time and displaying, on the signage apparatus, the display information which is generated as the content, by performing the processes illustrated in FIGS. 12 to 16.

Note that in the second embodiment, as for the height of the camera 306, the camera 306 can be installed at a higher position. Therefore, it is possible to acquire the screen image which is photographed in a wider range as compared with the camera 208 which is carried on the vehicle onboard apparatus 20. For example, if the camera 306 is installed, for example, on a footbridge which spans an expressway having two lanes or three lanes on one side, it is possible to detect the behavior of the vehicle which continues the tailgating for a long term and which travels, for example, on the passing lane (overtaking lane). Further, it is possible to detect the behavior of the vehicle which travels while repeating the lane change among a plurality of lanes. In the second embodiment, the frequency of the lane change (behavior of the vehicle which frequently repeats the lane change) can be included in the judgment condition, as the behavior of the vehicle for specifying the dangerous driving state.

OTHER EMBODIMENTS

The embodiments described above are exemplified by way of example in every sense. Those disclosed in the embodiments of the present disclosure may be carried out while appropriately making changes within a range without deviating from the gist or essential characteristics thereof. The processes and the means explained in this disclosure can be carried out while freely combining them unless any technical contradiction or inconsistency arises.

Further, the process, which has been explained as being performed by one apparatus or device, may be executed by a plurality of apparatuses or devices in a shared manner. Alternatively, the process, which has been explained as being performed by the different apparatuses or devices, may be executed by one apparatus or device without causing any problem. In the computer system, it is possible to flexibly change the way of realization of the respective functions by means of any hardware configuration (server configuration).

A program, which allows an information processing apparatus or any other machine, apparatus, or device (hereinafter referred to as "computer or the like") to realize any one of the functions described above, can be recorded on a recording medium which is readable by the computer or the like. Then, it is possible to provide the function by reading and executing the program on the recording medium by the computer or the like.

The recording medium, which is readable by the computer or the like, herein refers to such a recording medium that the information such as the data, the program or the like is accumulated in accordance with the electric, magnetic, optical, mechanical, or chemical action, and the information can be read from the computer or the like. The recording medium, which is included in the recording medium as described above and which can be removed from the computer or the like, is exemplified, for example, by flexible disk, magneto-optical disk, CD-ROM, CD-R/W, DVD, Blu-ray Disc, DAT, 8 mm tape, and memory card such as flash memory or the like. Further, the recording medium, which is fixed to the computer or the like, is exemplified, for example, by hard disk and ROM.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information system comprising:
 a controller which includes at least one processor, the controller configured to execute:
  acquiring a screen image of a vehicle which is traveling on a roadway, the screen image being photographed by aid of a camera carried on another vehicle which is traveling on the roadway;
  detecting, in accordance with a time course of the screen image, a dangerous driving state of the vehicle which is traveling, the dangerous driving state being detected based on a driving action of the traveling vehicle which causes a traffic danger on the roadway;
  acquiring position information at which the screen image is photographed;
  extracting a signage apparatus installed in an area corresponding to the position information;
  judging a degree of danger of the vehicle which is in the dangerous driving state; and
  displaying information in relation to the vehicle having been detected to be in the dangerous driving state on the extracted signage apparatus such that the information in relation to the vehicle having been detected to be in the dangerous driving state is (i) displayed so as to interrupt currently displayed content on the signage apparatus, in response to judging the degree of danger is a first degree of danger, and (ii) displayed after termination of the currently displayed content on the signage apparatus without interruption, in response to judging the degree of danger is a second degree of danger, the first degree of danger being greater than the second degree of danger.

2. The information system according to claim 1, wherein the controller further executes detecting the dangerous driving state from at least one piece of information of: a speed of the vehicle, an acceleration, a distance between the vehicle and the other vehicle, the other vehicle traveling ahead of or behind the vehicle, an attitude of the vehicle, a frequency of lane change, and presence or absence of traveling in a traveling restricted area.

3. An information processing method causing a computer to execute:
 a step of acquiring a screen image of a vehicle which is traveling on a roadway, the screen image being photographed by aid of a camera carried on another vehicle which is traveling on the roadway;
 a step of detecting, in accordance with a time course of the screen image, a dangerous driving state of the vehicle which is traveling, the dangerous driving state being detected based on a driving action of the traveling vehicle which causes a traffic danger on the roadway;
 a step of acquiring position information at which the screen image is photographed;
 a step of extracting a signage apparatus installed in an area corresponding to the position information;
 a step of judging a degree of danger of the vehicle which is in the dangerous driving state; and
 a step of displaying information in relation to the vehicle having been detected to be in the dangerous driving state on the extracted signage apparatus such that the information in relation to the vehicle having been detected to be in the dangerous driving state is (i) displayed so as to interrupt currently displayed content on the signage apparatus, in response to judging the degree of danger is a first degree of danger, and (ii) displayed after termination of the currently displayed content on the signage apparatus without interruption, in response to judging the degree of danger is a second degree of danger, the first degree of danger being greater than the second degree of danger.

4. A non-transitory storage medium stored with an information processing program, the information processing program causing a computer to execute:

a step of acquiring a screen image of a vehicle which is traveling on a roadway, the screen image being photographed by aid of a camera carried on another vehicle which is traveling on the roadway;

a step of detecting, in accordance with a time course of the screen image, a dangerous driving state of the vehicle which is traveling, the dangerous driving state being detected based on a driving action of the traveling vehicle which causes a traffic danger on the roadway;

a step of acquiring position information at which the screen image is photographed;

a step of extracting a signage apparatus installed in an area corresponding to the position information;

a step of judging a degree of danger of the vehicle which is in the dangerous driving state; and a step of displaying information in relation to the vehicle having been detected to be in the dangerous driving state on the extracted signage apparatus such that the information in relation to the vehicle having been detected to be in the dangerous driving state is (i) displayed so as to interrupt currently displayed content on the signage apparatus, in response to judging the degree of danger is a first degree of danger, and (ii) displayed after termination of the currently displayed content on the signage apparatus without interruption, in response to judging the degree of danger is a second degree of danger, the first degree of danger being greater than the second degree of danger.

* * * * *